(12) United States Patent
Gruber et al.

(10) Patent No.: US 10,445,902 B2
(45) Date of Patent: Oct. 15, 2019

(54) FETCH REDUCTION FOR FIXED COLOR AND PATTERN SUB-FRAMES

(71) Applicant: QUALCOMM Incorporated, San Diego, CA (US)

(72) Inventors: Andrew Evan Gruber, Arlington, MA (US); Serag GadelRab, Markham (CA); Zhenbiao Ma, Fremont, CA (US); Meghal Varia, Brampton (CA); Tao Wang, Sunnyvale, CA (US); Tom Longo, Markham (CA); Mark Sternberg, Toronto (CA); Paul Chow, Richmond Hill (CA)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 15/377,801

(22) Filed: Dec. 13, 2016

(65) Prior Publication Data

US 2018/0165789 A1 Jun. 14, 2018

(51) Int. Cl.
| | |
|---|---|
| G09G 5/36 | (2006.01) |
| G06T 11/00 | (2006.01) |
| G06T 1/20 | (2006.01) |
| G09G 5/395 | (2006.01) |
| G06T 11/40 | (2006.01) |

(52) U.S. Cl.
CPC .............. *G06T 11/001* (2013.01); *G06T 1/20* (2013.01); *G06T 11/40* (2013.01); *G09G 5/363* (2013.01); *G09G 5/395* (2013.01); *G09G 2340/02* (2013.01); *G09G 2340/16* (2013.01); *G09G 2350/00* (2013.01); *G09G 2360/121* (2013.01); *G09G 2360/122* (2013.01); *G09G 2360/18* (2013.01)

(58) Field of Classification Search
None
See application file for complete search history.

(56) References Cited

U.S. PATENT DOCUMENTS

| | | | |
|---|---|---|---|
| 7,450,120 B1 * | 11/2008 | Hakura | G06T 15/005 345/421 |
| 7,965,902 B1 * | 6/2011 | Zelinka | G06F 17/3028 348/218.1 |
| 2011/0102446 A1 | 5/2011 | Oterhals et al. | |
| 2014/0192075 A1 | 7/2014 | Stamoulis et al. | |

(Continued)

OTHER PUBLICATIONS

International Search Report and Written Opinion—PCT/US2017/057637—ISA/EPO—Jan. 22, 2018 (14 pp.).

(Continued)

*Primary Examiner* — Nicholas R Wilson
(74) *Attorney, Agent, or Firm* — Shumaker & Sieffert, P.A.

(57) ABSTRACT

Techniques are described in which a device is configured to retrieve a metadata buffer for rendering a sub-frame of a set of sub-frames for a frame. A data block of a data buffer is configured to store image data for rendering the sub-frame. In response to determining, based on the metadata buffer for rendering the sub-frame, that the sub-frame includes a color pattern, fixed color value, or combination thereof, the device refrains from retrieving the image data from the data block of the data buffer and determines the image data for rendering the sub-frame based on the metadata buffer.

15 Claims, 20 Drawing Sheets

(56) References Cited

U.S. PATENT DOCUMENTS

| | | |
|---|---|---|
| 2014/0219573 A1 | 8/2014 | Teng et al. |
| 2014/0340434 A1 | 11/2014 | El-Ghoroury et al. |
| 2015/0379684 A1 | 12/2015 | Ramani et al. |
| 2016/0037019 A1 | 2/2016 | Xue et al. |
| 2016/0042491 A1 | 2/2016 | Croxford et al. |

OTHER PUBLICATIONS

Response to Written Opinion from corresponding PCT Application Serial No. PCT/US2017/057637 filed on Apr. 27, 2018 (28 pp).
Second Written Opinion from International Application No. PCT/US2017/057637, dated Nov. 2, 2018, 6 pp.
International Preliminary Report on Patentability from International Application No. PCT/US2017/057637, dated Feb. 18, 2019, 24 pp.

\* cited by examiner

| METADATA BUFFER 860 | | | |
|---|---|---|---|
| SUB-FRAME 1 | SIZE | TYPE | ATTRIBUTES = ALL PIXELS HAVE SAME COLOR | FIXED COLOR DATA PORTION A — 870A |
| SUB-FRAME 2 | SIZE | TYPE | ATTRIBUTES = ALL PIXELS HAVE SAME COLOR | FIXED COLOR DATA PORTION B — 870B |
| SUB-FRAME 3 | SIZE | TYPE | ATTRIBUTES = ALL PIXELS HAVE SAME COLOR | FIXED COLOR DATA PORTION C |
| SUB-FRAME 4 | SIZE | TYPE | ATTRIBUTES = ALL PIXELS HAVE SAME COLOR | FIXED COLOR DATA PORTION D |

| METADATA BUFFER 960 | | | | |
|---|---|---|---|---|
| SUB-FRAME 1 | SIZE | TYPE | ATTRIBUTES | FIXED COLOR INDICATOR | NEXT 970A |
| SUB-FRAME 2 | SIZE | TYPE | ATTRIBUTES | FIXED COLOR INDICATOR | PREVIOUS 970B |
| SUB-FRAME 3 | SIZE | TYPE | ATTRIBUTES | FIXED COLOR INDICATOR | NEXT |
| SUB-FRAME 4 | SIZE | TYPE | ATTRIBUTES | FIXED COLOR INDICATOR | PREVIOUS |

FIG. 9

| | | | METADATA BUFFER 1060 | | |
|---|---|---|---|---|---|
| SUB-FRAME 1 | SIZE | TYPE | ATTRIBUTES | FIXED COLOR INDICATOR | - |
| SUB-FRAME 2 | SIZE | TYPE | ATTRIBUTES | FIXED COLOR INDICATOR | 1 SUB-FRAME BACK — 1070B |
| SUB-FRAME 3 | SIZE | TYPE | ATTRIBUTES | FIXED COLOR INDICATOR | 2 SUB-FRAMES BACK — 1070C |
| SUB-FRAME 4 | SIZE | TYPE | ATTRIBUTES | FIXED COLOR INDICATOR | 3 SUB-FRAMES BACK |

| METADATA BUFFER 1360 | | | | |
|---|---|---|---|---|
| SUB-FRAME 1 | SIZE | TYPE | ATTRIBUTES | SIMILAR TILE = 1 |
| SUB-FRAME 4 | SIZE | TYPE | ATTRIBUTES | SIMILAR TILE = 1 |
| SUB-FRAME 5 | SIZE | TYPE | ATTRIBUTES | SIMILAR TILE = 1 |
| SUB-FRAME 7 | SIZE | TYPE | ATTRIBUTES | SIMILAR TILE = 1 |
| SUB-FRAME 2 | SIZE | TYPE | ATTRIBUTES | SIMILAR TILE = 0 |
| SUB-FRAME 3 | SIZE | TYPE | ATTRIBUTES | SIMILAR TILE = 0 |
| SUB-FRAME 6 | SIZE | TYPE | ATTRIBUTES | SIMILAR TILE = 0 |

1369 (brace grouping sub-frames 1, 4, 5, 7)
1370 (brace grouping similar tile column)

Solid Tile/Group Ratio

| UXCase | 0SolidGroup | 1SolidGroup | 2SolidGroup | 3SolidGroup | 4SolidGroup | 5SolidGroup | 6SolidGroup | 7SolidGroup | 8SolidGroup | SolidTilesARGB |
|---|---|---|---|---|---|---|---|---|---|---|
| UXUCBrowsertheverge | 83% | 1% | 2% | 0% | 3% | 0% | 1% | 0% | 10% | 13% |
| UXsysUIRecentApps | 44% | 3% | 8% | 2% | 8% | 1% | 8% | 1% | 24% | 46% |
| UXSYSUINotificationBar | 29% | 1% | 2% | 1% | 3% | 1% | 5% | 1% | 60% | 67% |
| UXSmokeLWP | 100% | 0% | 0% | 0% | 0% | 0% | 0% | 0% | 0% | 0% |
| UXGMailScrollHigh | 80% | 1% | 2% | 1% | 4% | 1% | 2% | 1% | 9% | 15% |
| UXGalleryLaunch | 56% | 3% | 5% | 2% | 5% | 1% | 2% | 1% | 25% | 19% |
| UXChromeBackImage | 96% | 0% | 1% | 0% | 2% | 0% | 0% | 0% | 1% | 2% |
| AverageRatio | | | | | | | | | 18% | 24% |

FIG. 17

FETCH REDUCTION FOR FIXED COLOR AND PATTERN SUB-FRAMES

TECHNICAL FIELD

This disclosure relates to memory fetching, including techniques for memory fetching by a graphic processing unit (GPU).

BACKGROUND

Mobile devices are powered by batteries of limited size and/or capacity. Typically, mobile devices are used for making phone calls, checking email, recording/playback of a picture/video, listening to radio, navigation, web browsing, playing games, managing devices, and performing calculations, among other things. Many of these actions utilize a graphics processing unit (GPU) to perform some tasks. Example GPU tasks include the rendering of content to a display using system memory (e.g., bin memory, such as dynamic random-access memory (DRAM)). Therefore, the GPU typically performs many fetches from the system memory, which consumes power.

SUMMARY

In general, the disclosure describes techniques for reducing a quantity of fetches by a graphics processing unit (GPU) to memory. In some examples, rather than performing a fetch in a system memory for a color pattern and/or a fixed color value, GPU determines image data based on information stored in a metadata buffer. For instance, the GPU may embed a fixed color value in the metadata buffer, thereby allowing the fixed color value to be determined without requiring a fetch from system memory for the fixed color value. In some examples where a particular color pattern and/or a fixed color value occurs in multiple sub-frames of a frame, the GPU may embed a pointer to a previous sub-frame in the metadata. In this manner, the GPU may render a current sub-frame using image data previously retrieved for another sub-frame that has a similar color pattern and/or a fixed color value. In the example, rather than performing a fetch in the system memory, the GPU may retrieve image data from a cache that is for other sub-frames but identified by the metadata buffer to include the particular color pattern and/or a fixed color value. In this manner, the GPU may access image data using a cache instead of fetching image data from system memory. In some examples, the GPU may generate, in cache, a color dictionary indicating fixed color values and indicate, in a metadata buffer, a particular fixed color value of the color dictionary for rendering a sub-frame. In some examples, the GPU may generate a fixed color data stream indicating fixed color values for a set of sub-frames and indicate, in a metadata buffer, that a particular fixed color value for a sub-frame is included in the fixed color data stream.

In one example, the disclosure describes a method including retrieving a metadata buffer for rendering a sub-frame of a set of sub-frames for a frame. A data block of a data buffer is configured to store image data for rendering the sub-frame. The method further includes, in response to determining, based on the metadata buffer for rendering the sub-frame, that the sub-frame includes a color pattern, fixed color value, or combination thereof, refraining from retrieving the image data from the data block of the data buffer and determining the image data for rendering the sub-frame based on the metadata buffer.

In one example, the disclosure describes a device including a data buffer configured to store image data for rendering a frame, a metadata buffer for rendering a sub-frame of a set of sub-frames for a frame, and a processor. A data block of a data buffer is configured to store image data for rendering the sub-frame. The processor includes integrated circuitry, the processor configured to, in response to determining, based on the metadata buffer for rendering the sub-frame, that the sub-frame includes a color pattern, fixed color value, or combination thereof, refrain from retrieving the image data from the data block of the data buffer and determine the image data for rendering the sub-frame based on the metadata buffer.

In one example, the disclosure describes a non-transitory computer-readable storage medium storing instructions that when executed cause one or more processors to retrieve a metadata buffer for rendering a sub-frame of a set of sub-frames for a frame. A data block of a data buffer is configured to store image data for rendering the sub-frame. The one or more processors are further caused to, in response to determining, based on the metadata buffer for rendering the sub-frame, that the sub-frame includes a color pattern, fixed color value, or combination thereof, refrain front retrieving the image data from the data block of the data buffer and determine the image data for rendering the sub-frame based on the metadata buffer.

In one example, the disclosure describes a device including means for retrieving a metadata buffer for rendering a sub-frame of a set of sub-frames for a frame. A data block of a data buffer is configured to store image data for rendering the sub-frame. The device further includes means for refraining from retrieving the image data from the data block of the data buffer in response to determining, based on the metadata buffer for rendering the sub-frame, that the sub-frame includes a color pattern, fixed color value, or combination thereof and means for determining the image data for rendering the sub-frame based on the metadata buffer in response to determining, based on the metadata buffer for rendering the sub-frame, that the sub-frame includes a color pattern, fixed color value, or combination thereof.

The details of one or more examples are set forth in the accompanying drawings and the description below. Other features, objects, and advantages will be apparent from the description, drawings, and claims.

BRIEF DESCRIPTION OF DRAWINGS

FIG. 8 is an illustration of a fourth exemplary metadata buffer in accordance with one or more example techniques described in this disclosure.

FIG. 9 is an illustration of a fifth exemplary metadata buffer in accordance with one or more example techniques described in this disclosure.

FIG. 10 is an illustration of a sixth exemplary metadata buffer in accordance with one or more example techniques described in this disclosure.

FIG. 13 is an illustration of a ninth exemplary metadata buffer in accordance with one or more example techniques described in this disclosure.

FIG. 17 is a graph illustrating clustering of color sub-frames in accordance with one or more example techniques described in this disclosure.

DETAILED DESCRIPTION

Figure 1:
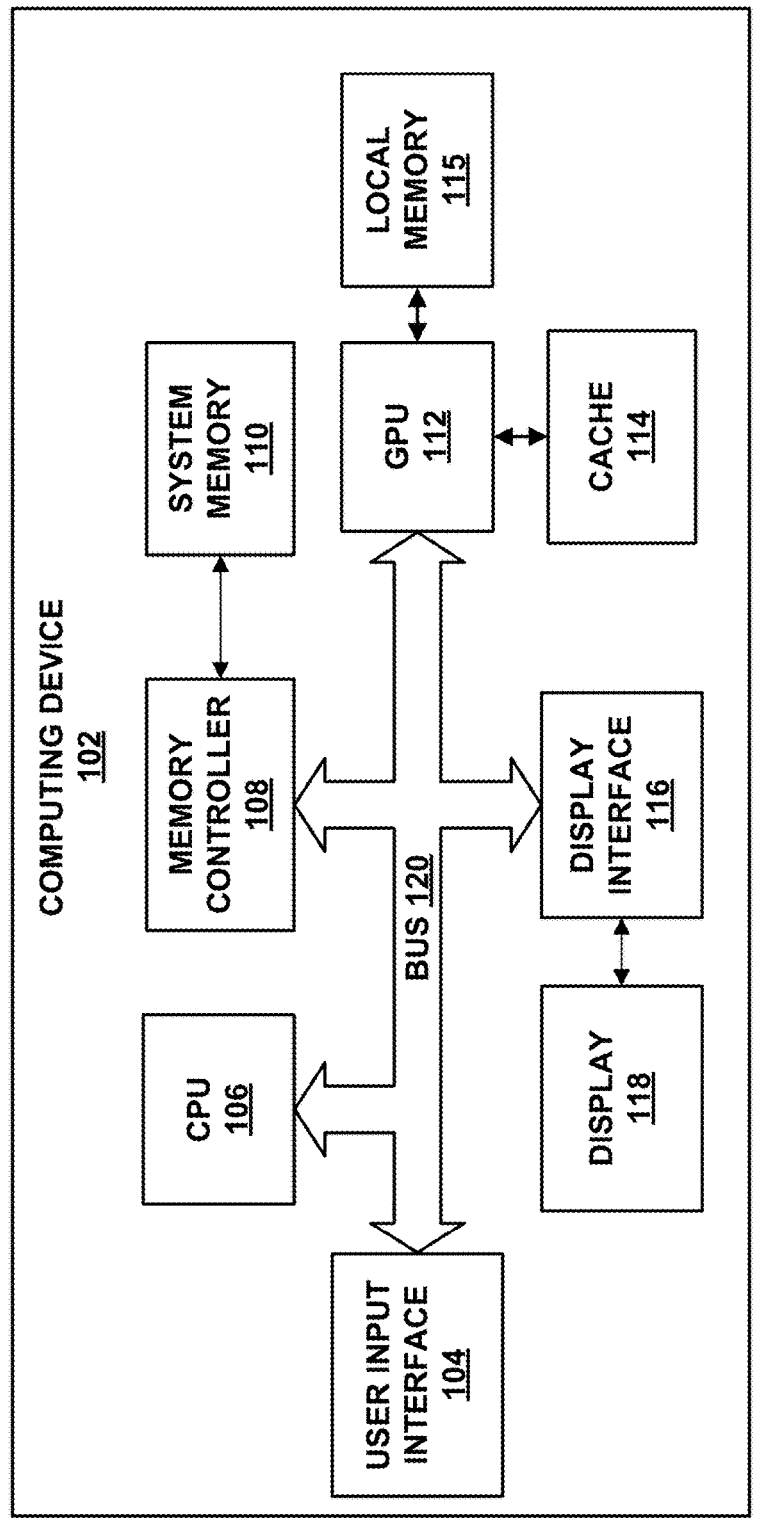
FIG. 1 is a block diagram illustrating an example device for processing data in accordance with one or more example techniques described in this disclosure.

This disclosure is related to memory fetch operations by a processing unit, such as graphics processing unit (GPU), digital signal processor (DSP), central processing unit (CPU), or other processing units that may perform fetch operations on image or video data. A processing unit, such as a GPU, may access a system memory (e.g., bin memory) that stores image data of a frame for display. Examples of system memory may include dynamic random-access memory (DRAM). However, each read/write of system memory may contribute to a power consumption of a device containing the GPU. In other words, each additional read/write (e.g., fetch) of system memory may result in higher power consumption by the GPU.

A frame may be logically divided into sub-frames (e.g., units, compressor blocks, tiles, etc.). Each sub-frame may be assigned a fixed number of bytes, for example, 256 bytes and stored in system memory (e.g., image buffer). A hardware and/or software compressor may compress image data for each sub-frame in a frame to generate compressed image data. Image data for each sub-frame may be compressed, by the compressor, to a minimum possible size without loss of features such that the compressed image data may be later decompressed to produce identical image data to the uncompressed image data. For example, image data for each sub-frame of a frame stored in system memory may be 256 bytes. In the example, a first set of the sub-frames may not be compressed without loss of features such that compressed and uncompressed image data for the sub-frame are identical (e.g., "Size=k"). A second set of the sub-frames may be compressed to 192 bytes (e.g., "Size=k-68"). A third set of the sub-frames may be compressed to 128 bytes (e.g., "Size=k-128"). A fourth set of the sub-frames may be compressed to 64 bytes (e.g., "Size=k-192").

However, rather than a decompressor necessarily fetching 256 bytes for each compressed unit, the compressor may generate a companion buffer that contains a metadata buffer. The metadata buffer may include a brief description of the size of each compressed unit (e.g., sub-frame). In some examples, a system memory (e.g., DRAM) fetch may be limited to fixed blocks of bytes, referred to as access block size (e.g., DRAM ABS) of, for example, 64 bytes. As such, the size may indicate a multiple of the access block size. In one example, the size portion of the metadata buffer for the first set of sub-frames may be 4, the size portion of the metadata buffer for the second set of sub-frames may be 3, the size portion of the metadata buffer for the third set of sub-frames may be 2, and the size portion of the metadata buffer for the fourth set of sub-frames may be 1. In this manner, the decompressor may use the size portion of the metadata buffer to determine an amount of data to fetch for decompressing a compressed unit of the frame from system memory.

In some examples, the metadata buffer, in addition to indicating the size, may indicate other information. For example, the metadata buffer may indicate a type, or attribute for a corresponding sub-frame. In some implementations, the metadata buffer may be a byte (i.e., 8 bits). Accordingly, in some implementations, a GPU may use the metadata buffer to further reduce an amount of data fetched from the system memory. That is, the GPU may use the metadata buffer to decrease a quantity of system memory fetches or an amount of data fetched from system memory while the size of the frame stored in system memory may remain the same, or in some cases may increase. Said differently, a GPU may use the metadata buffer to decrease a bandwidth (e.g., a quantity of fetches) between the GPU and system memory during compression and decompression independently from a compression ratio of the compression and decompression process.

This disclosure describes example techniques and devices for reducing a quantity of fetches for data from system memory. In some examples, rather than performing a fetch in system memory for a color pattern and/or a fixed color value, the GPU (or other processor) determines image data based on information stored in a metadata buffer. For instance, the GPU may embed a fixed color value in the metadata buffer. In some examples where a particular color pattern and/or a fixed color value occurs in multiple sub-frames (e.g., tiles, units, etc.) of a sub-frame, the GPU may retrieve the particular color pattern and/or a fixed color value image data from the system memory for storage in cache for a first sub-frame of a set of sub-frames identified by the metadata buffer. In the example, the GPU may retrieve, for other sub-frames of the set identified by the metadata buffer to include the particular color pattern and/or a fixed color value, image data from cache rather than a separate fetch to system memory. In this manner, the GPU may access image data using a cache instead of fetching duplicative image data from system memory, potentially saving memory bandwidth and power consumption. In some examples, the GPU may generate, in local memory, a color dictionary indicating fixed color values and indicate, in a metadata buffer, a particular fixed color value of the color dictionary for rendering a sub-frame. In some examples, the GPU may generate a fixed color data stream configured to indicate a fixed color value for each sub-frame of a set of sub-frames and indicate, in a metadata buffer, whether each sub-frame of the set has a fixed color value in the fixed color data stream.

FIG. 1 is a block diagram illustrating an example computing device 102 that may be used to implement techniques of this disclosure. Computing device 102 may comprise a personal computer, a desktop computer, a laptop computer, a computer workstation, a video game platform or console, a wireless communication device (such as, a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 102 includes a user input interface 104, a CPU 106, a memory controller 108, a system memory 110, a graphics processing unit (GPU) 112, a cache 114, local memory 115, a display interface 116, a display 118, and bus 120. User input interface 104, CPU 106, memory controller 108, GPU 112, and display interface 116 may communicate with each other using bus 120. Bus 120 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 106 may comprise a general-purpose or a special-purpose processor that controls operation of computing device 102. A user may provide input to computing device 102 to cause CPU 106 to execute one or more software applications. The software applications that execute on CPU 106 may include, for example, an operating system, a word processor application, an email application, a spread sheet application, a media player application, a video game application, a graphical user interface application or another program. The user may provide input to computing device 102 via one or more input devices (not shown) such as a keyboard, a mouse, a microphone, a touch pad or another input device that is coupled to computing device 102 via user input interface 104.

The software applications that execute on CPU 106 may include one or more graphics rendering instructions that instruct CPU 106 to cause the rendering of graphics data to display 118. In some examples, the software instructions may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

In order to process the graphics rendering instructions, CPU 106 may issue one or more graphics rendering commands to GPU 112 to cause GPU 112 to perform some or all of the rendering of the graphics data. In some examples, the graphics data to be rendered may include a list of graphics primitives, e.g., points, lines, triangles, quadralaterals, triangle strips, etc.

Memory controller 108 facilitates the transfer of data going into and out of system memory 110. For example, memory controller 108 may receive memory read and write commands, and service such commands with respect to system memory 110 in order to provide memory services for the components in computing device 102. Memory controller 108 is communicatively coupled to system memory 110. Although memory controller 108 is illustrated in the example computing device 102 of FIG. 1 as being a processing module that is separate from both CPU 106 and system memory 110, in other examples, some or all of the functionality of memory controller 108 may be implemented on one or both of CPU 106 and system memory 110.

System memory 110 may store program modules and/or instructions that are accessible for execution by CPU 106 and/or data for use by the programs executing on CPU 106. For example, system memory 110 may store user applications and graphics data associated with the applications. System memory 110 may additionally store information for use by and/or generated by other components of computing device 102. For example, system memory 110 may act as a device memory for GPU 112 and may store data to be operated on by GPU 112 as well as data resulting from operations performed by GPU 112. For example, system memory 110 may store any combination of texture buffers, depth buffers, stencil buffers, vertex buffers, frame buffers, or the like. In addition, system memory 110 may store command streams for processing by GPU 112. System memory 110 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 110 may include instructions that cause CPU 106 and/or GPU 112 to perform the functions ascribed in this disclosure to CPU 106 and GPU 112. Accordingly, system memory 110 may be a computer-readable storage medium having instructions stored thereon that, when executed, cause one or more processors (e.g., CPU 106 and GPU 112) to perform various functions.

In some examples, system memory 110 is a non-transitory storage medium. The term "non-transitory" indicates that the storage medium is not embodied in a carrier wave or a propagated signal. However, the term "non-transitory" should not be interpreted to mean that system memory 110 is non-movable or that its contents are static. As one example, system memory 110 may be removed from computing device 102, and moved to another device. As another example, memory, substantially similar to system memory 110, may be inserted into computing device 102. In certain examples, a non-transitory storage medium may store data that can, over time, change (e.g., in RAM).

GPU 112 may be configured to perform graphics operations to render one or more graphics primitives to display 118. Thus, when one of the software applications executing on CPU 106 requires graphics processing. CPU 106 may provide graphics commands and graphics data to GPU 112 for rendering to display 118. The graphics commands may include, e.g., drawing commands such as a draw call, GPU state programming commands, memory transfer commands, general-purpose computing commands, kernel execution commands, etc. In some examples, CPU 106 may provide the commands and graphics data to GPU 112 by writing the commands and graphics data to system memory 110, which may be accessed by GPU 112. In some examples, GPU 112 may be further configured to perform general-purpose computing for applications executing on CPU 106.

GPU 112 may, in some instances, be built with a highly-parallel structure that provides more efficient processing of vector operations than CPU 106. For example, GPU 112 may include a plurality of processing elements that are configured to operate on multiple vertices or pixels in a parallel manner. The highly parallel nature of GPU 112 may, in some instances, allow GPU 112 to draw graphics images (e.g., GUIs and two-dimensional (2D) and/or three-dimensional (3D) graphics scenes) onto display 118 more quickly than drawing the scenes directly to display 118 using CPU 106. In addition, the highly parallel nature of GPU 112 may allow GPU 112 to process certain types of vector and matrix operations for general-purpose computing applications more quickly than CPU 106.

GPU 112 may, in some instances, be integrated into a motherboard of computing device 102. In other instances, GPU 112 may be present on a graphics card that is installed in a port in the motherboard of computing device 102 or may be otherwise incorporated within a peripheral device configured to interoperate with computing device 102. In further instances, GPU 112 may be located on the same microchip as CPU 106 forming a system on a chip (SoC). GPU 112 and CPU 106 may include one or more processors, such as one or more microprocessors, application specific integrated circuits (ASICs), field programmable gate arrays (FPGAs), digital signal processors (DSPs), or other equivalent integrated or discrete logic circuitry.

GPU 112 may be directly coupled to cache 114. Thus, GPU 112 may read (e.g., fetch) data from and write data to cache 114 without necessarily using bus 120. In other words, GPU 112 may process data locally using a local storage, instead of off-chip memory (e.g., memory accessible by a bus). This allows GPU 112 to operate in a more efficient manner by eliminating the need of GPU 112 to read and write data via bus 120, which may experience heavy bus traffic. In some instances, however, GPU 112 may not include a separate cache, but instead utilize system memory 110 via bus 120. Cache 114 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

GPU 112 may be directly coupled to local memory 115. Thus, GPU 112 may read (e.g., fetch) data from and write data to local memory 115 without necessarily using bus 120. Local memory 115 may include non-volatile memory. Examples of non-volatile memory may include, but are not limited to, ROM, erasable programmable ROM (EPROM), electrically erasable programmable ROM (EEPROM), flash memory, a magnetic data media, an optical storage media, or another non-volatile memory.

CPU 106 and/or GPU 112 may store rendered image data in a frame buffer that is allocated within system memory 110. Display interface 116 may retrieve the data from the frame buffer and configure display 118 to display the image represented by the rendered image data. In some examples, display interface 116 may include a digital-to-analog converter (DAC) that is configured to convert the digital values retrieved from the frame buffer into an analog signal consumable by display 118. In other examples, display interface 116 may pass the digital values directly to display 118 for processing. Display 118 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display, or another type of display unit. Display 118 may be integrated within computing device 102. For instance, display 118 may be a screen of a mobile telephone handset or a tablet computer. Alternatively, display 118 may be a stand-alone device coupled to computing device 102 via a wired or wireless communications link. For instance, display 118 may be a computer monitor or flat panel display connected to a personal computer via a cable or wireless link.

As described, CPU 106 may offload graphics processing to GPU 112, such as tasks that require massive parallel operations. As one example, graphics processing requires massive parallel operations, and CPU 106 may offload such graphics processing tasks to GPU 112. However, other operations such as matrix operations may also benefit from the parallel processing capabilities of GPU 112. In these examples, CPU 106 may leverage the parallel processing capabilities of GPU 112 to cause GPU 112 to perform non-graphics related operations.

In the techniques described in this disclosure, a first processing unit (e.g., CPU 106) offloads certain tasks to a second processing unit (e.g., GPU 112). To offload tasks, CPU 106 outputs commands to be executed by GPU 112 and data that are operands of the commands (e.g., data on which the commands operate) to system memory 110 and/or directly to GPU 112, GPU 112 receives the commands and data, directly from CPU 106 and/or from system memory 110, and executes the commands. In some examples, rather than storing commands to be executed by GPU 112, and the data operands for the commands, in system memory 110. CPU 106 may store the commands and data operands in a cache that is local to the integrated circuit (IC) that includes GPU 112 and CPU 106 and shared by both CPU 106 and GPU 112 (e.g., cache 114). In general, the techniques described in this disclosure are applicable to the various ways in which CPU 106 may make available the commands for execution on GPU 112, and the techniques are not limited to the above examples.

In some examples, such as those where CPU 106 stores commands to be executed by GPU 112 in memory (e.g., system memory 110 or a cache), CPU 106 may output memory address information identifying a group of commands that GPU 112 is to execute. The group of commands that GPU 112 is to execute is referred to as submitted commands. In examples where CPU 106 directly outputs the commands to GPU 112, the submitted commands includes those commands that CPU 106 instructs GPU 112 to execute immediately.

There may be various ways in which CPU 106 may group commands. As one example, a group of commands includes all the commands needed by GPU 112 to render one frame. As another example, a group of commands may be so-called "atomic commands" that are to be executed together without GPU 112 switching to other commands. Other ways to group commands that are submitted to GPU 112 may be possible, and the disclosure is not limited to the above example techniques.

The techniques described in this disclosure describe example ways in which to reduce a quantity of fetches for data buffered in system memory 110. In some examples, rather than performing a fetch in system memory 110 for a color pattern and/or a fixed color value, GPU 112 determines image data based on a metadata buffer stored in system memory 110. Said differently, a metadata buffer may indicate to GPU 112 situations where image data for a sub-frame may be reused or may be generated without additional fetches from system memory 110. As used herein, fixed color may refer to instances where each pixel in a sub-frame has a fixed red green blue alpha (RGBa) color. For instance, a fixed color may be a solid color texture. In some examples, a fixed color may refer to instances where each pixel in a sub-frame has a fixed RGBa color and a fixed alpha (e.g., opacity).

In one example, GPU 112 may embed a fixed color value in the metadata buffer stored in system memory 110. In the example, GPU 112 determines image data according to the embedded fixed color values in the metadata buffer stored in system memory 110 rather than performing an additional fetch in system memory 110 for the image data.

In some examples where a particular color pattern and/or a fixed color value occurs in multiple sub-frames, GPU 112 embed a pointer in the metadata buffer stored in system memory 110 that indicates another sub-frame that has a similar color pattern and/or a fixed color value. In the example, GPU 112 determines image data according to the embedded pointer in the metadata buffer stored in system memory 110 rather than performing an additional fetch in system memory 110 for the image data.

In one example, GPU 112 may generate, in local memory 115, a color dictionary indicating fixed color values and indicate, in a metadata buffer stored in system memory 110, a particular fixed color value of the color dictionary for rendering a sub-frame. In the example, GPU 112 determines image data according to the particular fixed color value of the color dictionary that is indicated by the metadata buffer rather than performing an additional fetch in system memory 110 for the image data.

In one example, GPU 112 may generate a fixed color data stream configured to indicate a fixed color value for each sub-frame of a set of sub-frames and indicate, in a metadata buffer, whether each sub-frame of the set of sub-frames has a fixed color value in the fixed color data stream. In the example, GPU 112 determines image data according to the fixed color data stream rather than performing another fetch in system memory 110 for the image data.

A frame, as used in this disclosure, may refer to a full image, but may be a portion of the full image in some examples, that can be presented. For example, there may be a static background that is not re-rendered each time, but the frame rendered by GPU 112 may be composited (e.g., by display interface 116) with the static background to generate the full image. As another example, display interface 116 may combine video and the frame rendered by GPU 112.

The frame includes a plurality of pixels that represent graphical content, with each pixel having a pixel value. For instance, after GPU 112 renders a frame, GPU 112 stores the resulting pixel values of the pixels (e.g., sub-frame) of the frame in a frame buffer, which may be in system memory 110. Display interface 116 receives the pixel values of the pixels of the frame from the frame buffer and outputs values based on the pixel values to cause display 118 to display the graphical content of the frame. In some examples, display interface 116 causes display 118 to display frames at a rate of 60 frames per second (fps) (e.g., a frame is displayed approximately every 16.67 ms).

In the techniques described in this disclosure, GPU 112 may retrieve a metadata buffer for rendering a sub-frame of a set of sub-frames for a frame. A data block of a data buffer (e.g., system memory 110) is configured to store image data for rendering the sub-frame. In response to determining, based on the metadata buffer for rendering the sub-frame, that the sub-frame includes a color pattern, fixed color value, or combination thereof, GPU 112 may be further configured to refrain from retrieving the image data from the data block of the data buffer and determine the image data for rendering the sub-frame based on the metadata buffer. For instance, GPU 112 may determine image data according to embedded fixed color values in the metadata buffer stored in system memory 110. In some instances, where a particular color pattern and/or a fixed color value occurs in multiple sub-frames, GPU 112 may determine image data according to an embedded pointer in the metadata buffer stored in system memory 110 that indicates another sub-frame that has a similar color pattern and/or a fixed color value. In this manner, rather than performing another fetch in system memory 110 for the image data, GPU 112 may determine the image data for rendering the sub-frame by accessing, from cache, image data previously retrieved from system memory 110 for another sub-frame.

Figure 2:
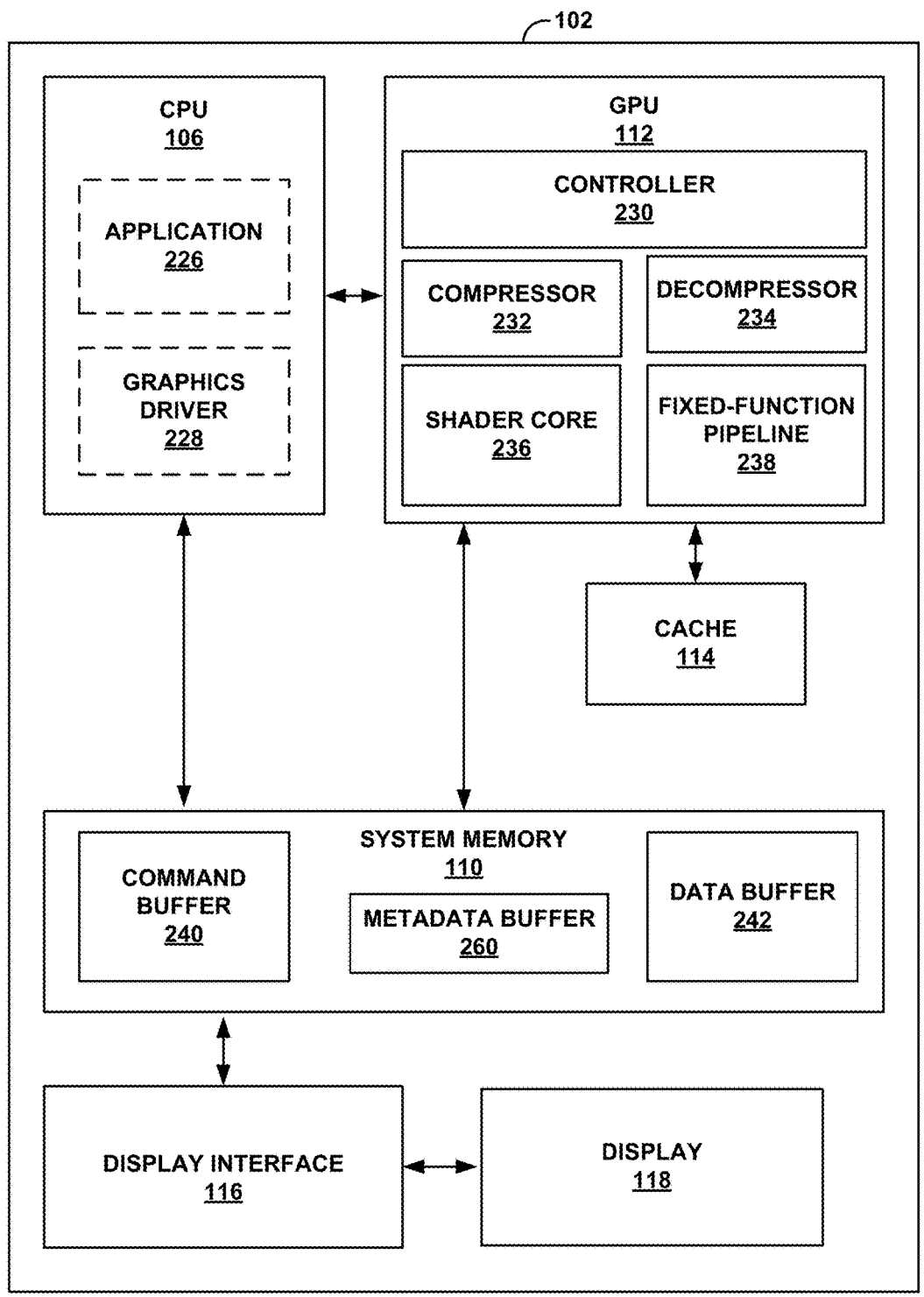
FIG. 2 is a block diagram illustrating a computing device in accordance with one or more example techniques described in this disclosure.

FIG. 2 is a block diagram illustrating a computing device 102 in accordance with one or more example techniques described in this disclosure. GPU 112 may include controller 230, compressor 232, decompressor 234, shader core 236, and fixed-function pipeline 238. Compressor 232 may be software and/or hardware configured to compresses each sub-frame in a frame to generate a compressed frame. Compressor 232 may compress each sub-frame to a minimum possible size without loss of features such that the compressed unit may be later decompressed (e.g., by decompressor 234) to produce identical image data to the uncompressed sub-frame. Decompressor 234 may be software and/or hardware configured to decompress image data for each sub-frame in a frame (e.g., compressed by compressor 232) for rendering of the frame. In some examples, compressor 232 and decompressor 234 may be combined. In some examples, one or more aspects of compressor 232 and/or decompressor 234 may be performed by CPU 106. For instance. CPU 106 may include compressor 232 and decompressor 234. In some examples, one or more aspects of compressor 232 and/or decompressor 234 may be performed by display interface 116. For instance, display interface 116 may include compressor 232 and decompressor 234. Shader core 236 and fixed-function pipeline 238 may together form an execution pipeline used to perform graphics or non-graphics related functions. Although only one shader core 236 is illustrated, in some examples, GPU 112 may include one or more shader cores similar to shader core 236.

The commands that GPU 112 are to execute may be executed by shader core 236 and fixed-function pipeline 238, as determined by controller 230 of GPU 112. Controller 230 may be implemented as hardware on GPU 112 or software or firmware executing on hardware of GPU 112. Controller 230 is an example of the controller described above for performing the example techniques in cases where GPU 112 is determining whether to fetch image data buffered in system memory 110.

Controller 230 may receive commands that are to be executed for rendering a frame from command buffer 240 of system memory 110 or directly from CPU 106 (e.g., receive the submitted commands that CPU 106 determined should now be executed by GPU 112). Controller 230 may also retrieve the operand data for the commands from data buffer 242 of system memory 110 or directly from CPU 106. For example, command buffer 240 may store a command to add 'A' and 'B.' Controller 30 retrieves this command from command buffer 240 and retrieves the values of 'A' and 'B' from data buffer 242. Controller 230 may determine which commands are to be executed by shader core 236 (e.g., software instructions are executed on shader core 236) and which commands are to be executed by fixed-function pipeline 238 (e.g., commands for units of fixed-function pipeline 238).

In some examples, commands and/or data from one or both of command buffer 240 and data buffer 242 may be part of cache 114 of GPU 112. For instance, GPU 112 may include an instruction cache and a data cache, which may be part of cache 114 that stores commands from command buffer 240 and data from data buffer 242, respectively. In these examples, controller 230 may retrieve the commands and/or data from cache 114.

Shader core 236 and fixed-function pipeline 238 may transmit and receive data from one another. For instance, some of the commands that shader core 236 executes may produce intermediate data that are operands for the commands that units of fixed-function pipeline 238 are to execute. Similarly, some of the commands that units of fixed-function pipeline 238 execute may produce intermediate data that are operands for the commands that shader core 236 is to execute. In this manner, the received data is progressively processed through units of fixed-function pipeline 238 and shader core 236 in a pipelined fashion. Hence, shader core 236 and fixed-function pipeline 238 may be referred to as implementing an execution pipeline. In some examples, GPU 112 may include more than one shader core 236, and the example in FIG. 2 is provided to merely assist with understanding.

In general, shader core 236 allows for various types of commands to be executed, meaning that shader core 236 is programmable and provides users with functional flexibility because a user can program shader core 236 to perform desired tasks in most conceivable manners. The fixed-function units of fixed-function pipeline 238, however, are hardwired for the manner in which the fixed-function units perform tasks. Accordingly, the fixed-function units may not provide much functional flexibility.

As described above. CPU 106 may offload tasks to GPU 112 due to parallel processing capabilities of GPU 112. For instance, GPU 112 may be designed with a single instruction, multiple data (SIMD) structure. In the SIMD structure, shader core 236 includes a plurality of SIMD processing elements, where each SIMD processing element executes same commands, but on different data.

A particular command executing on a particular SIMD processing element is referred to as a thread. Each SIMD processing element may be considered as executing a different thread because the data for a given thread may be different; however, the thread executing on a processing element is the same command as the command executing on the other processing elements. In this manner, the SIMD structure allows GPU 112 to perform many tasks in parallel (e.g., at the same time).

To avoid confusion, this disclosure uses the term "command" to generically refer to a process that is executed by shader core 236 or units of fixed-function pipeline 238. For instance, a command includes an actual command, constituent sub-commands (e.g., memory call commands), a thread, or other ways in which GPU 112 performs a particular function. Because GPU 112 includes shader core 236 and fixed-function pipeline 238, GPU 112 may be considered as executing the commands.

As illustrated in FIG. 2, CPU 106 executes application 226, as illustrated by the dashed boxes. During execution, application 226 generates commands that are to be executed GPU 112, including commands that instruct GPU 112 to retrieve and execute shader programs (e.g., vertex shaders, fragment shaders, compute shaders for non-graphics applications, and the like). In addition, application 226 generates the data on which the commands operate (i.e., the operands for the commands). CPU 106 stores the generated commands in command buffer 240, and stores the operand data in data buffer 242.

After CPU 106 stores the generated commands in command buffer 240, CPU 106 makes available the commands for execution by GPU 112. For instance. CPU 106 communicates to GPU 112 the memory addresses of a set of the stored commands and their operand data and information indicating when GPU 112 is to execute the set of commands. In this manner, CPU 106 submits commands to GPU 112 for executing to render a frame.

As illustrated in FIG. 2, CPU 106 may also execute graphics driver 228. In some examples, graphics driver 228 may be software or firmware executing on hardware or hardware units of CPU 106. Graphics driver 228 may be configured to allow CPU 106 and GPU 112 to communicate with one another. For instance, when CPU 106 offloads graphics or non-graphics processing tasks to GPU 112. CPU 106 offloads such processing tasks to GPU 112 via graphics driver 228. For example, when CPU 106 outputs information indicating the amount of commands GPU 112 is to execute, graphics driver 228 may be the unit of CPU 106 that outputs the information to GPU 112.

As additional examples, application 226 produces graphics data and graphics commands, and CPU 106 may offload the processing of this graphics data to GPU 112. In this example, CPU 106 may store the graphics data in data buffer 242 and the graphics commands in command buffer 240, and graphics driver 228 may instruct GPU 112 when to retrieve the graphics data and graphics commands from data buffer 242 and command buffer 240, respectively, from where to retrieve the graphics data and graphics commands from data buffer 242 and command buffer 240, respectively, and when to process the graphics data by executing one or more commands of the set of commands.

Also, application 226 may require GPU 112 to execute one or more shader programs. For instance, application 226 may require shader core 236 to execute a vertex shader and a fragment shader to generate pixel values for the frames that are to be displayed (e.g., on display 118 of FIG. 1). Graphics driver 228 may instruct GPU 112 when to execute the shader programs and instruct GPU 112 with where to retrieve the graphics data from data buffer 242 and where to retrieve the commands from command buffer 240 or from other locations in system memory 110. In this manner, graphics driver 228 may form a link between CPU 106 and GPU 112.

Graphics driver 228 may be configured in accordance to an application processing interface (API); although graphics driver 228 does not need to be limited to being configured in accordance with a particular API. In an example where computing device 102 is a mobile device, graphics driver 228 may be configured in accordance with the OpenGL ES API. The OpenGL ES API is specifically designed for mobile devices. In an example where computing device 102 is a non-mobile device, graphics driver 228 may be configured in accordance with the OpenGL API.

This disclosure describes example techniques and devices for reducing a quantity of fetches for data from system memory 110. In some examples, rather than fetching image data buffered in data buffer 242 of system memory 110, GPU 112 may determine the image data using metadata buffer 260. For instance, GPU 112 may determine the image data according to an embedded fixed color value included in metadata buffer 260. In some instances, GPU 112 may determine the image data according to a pointer included in metadata buffer 260 that identifies another sub-frame that has similar image data. In some instances, GPU 112 may determine the image data according to a color dictionary or fixed color data stream included in metadata buffer 260.

Figure 3:
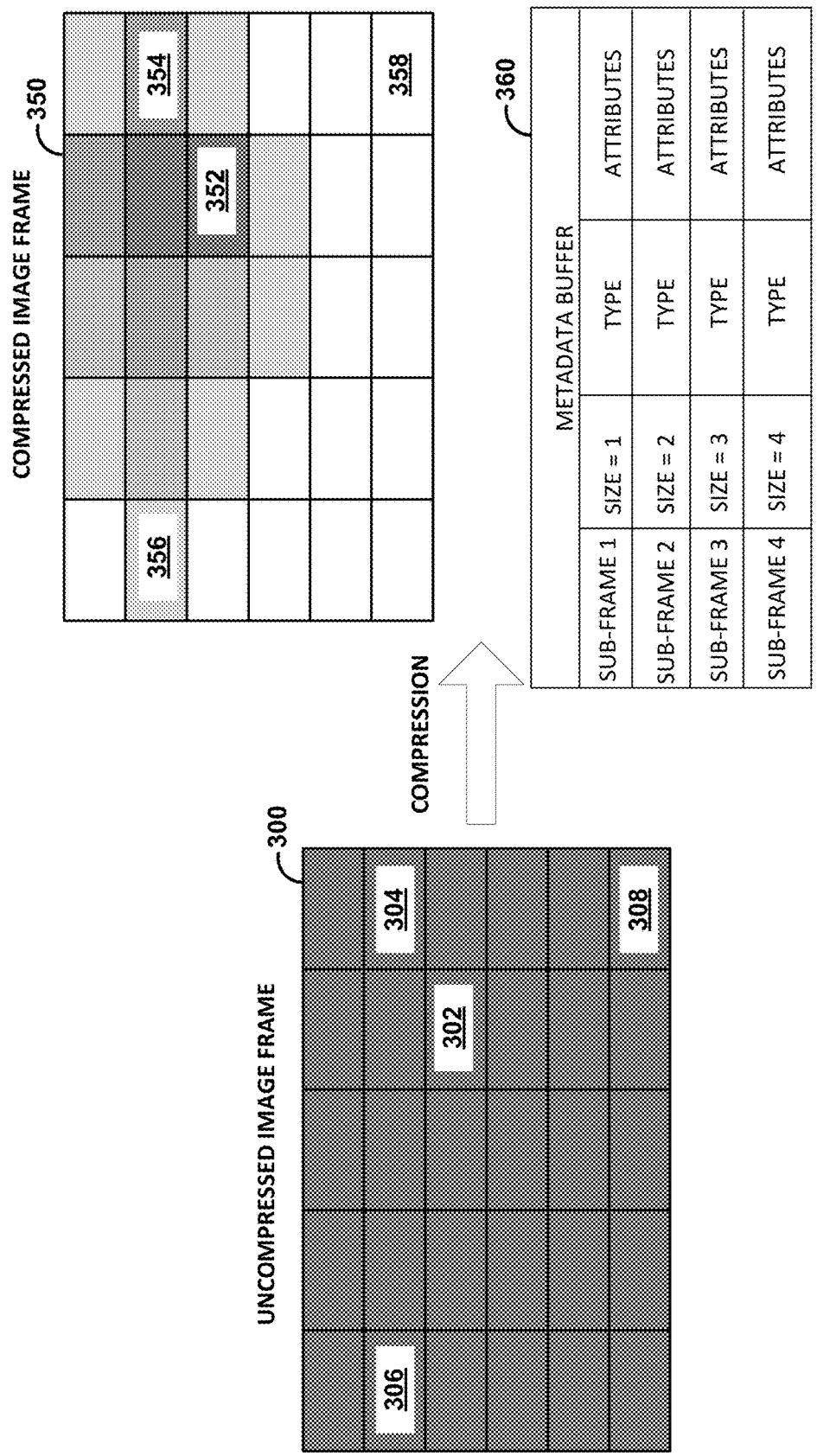
FIG. 3 is an illustration of compression of sub-frames of an exemplary frame in accordance with one or more example techniques described in this disclosure.

FIG. 3 is an illustration of compression of sub-frames of an exemplary frame 300 in accordance with one or more example techniques described in this disclosure. FIG. 3 is discussed with computing device 102 of FIGS. 1 and 2 for exemplary purposes only. In the example of FIG. 3, image frame 300 includes sub-frames 302, 304, 306, and 308. As indicated by dark shading, system memory 110 stores a size 'K' data block for each of sub-frames 302, 304, 306, and 308. In the example of FIG. 3, compressor 232 compresses sub-frame 302 from size 'K' into compressed sub-frame 352 having size 'K' (e.g., no compression), sub-frame 304 from size 'K' into compressed sub-frame 354 having size 'K−1' (e.g., slight compression), sub-frame 306 from size 'K' into compressed sub-frame 356 having size 'K−2' (e.g., moderate compression), and sub-frame 308 from size 'K' into compressed sub-frame 358 having size 'K−4' (e.g., high compression).

In some examples, system memory 110 may be configured to fetch data from data buffer 242 in an access block size (ABS). For instance, GPU 112 may cause system memory 110 to write compressed sub-frame 352 into four data blocks, compressed sub-frame 354 into three data blocks, compressed sub-frame 356 into two data blocks, and compressed sub-frame 358 into one data blocks.

GPU 112 may generate metadata buffer 360 to indicate a compression of frame 300 into compressed frame 350. Metadata buffer 360 may be stored in system memory 110. As shown, metadata buffer 360 indicates that sub-frame 1 (e.g., compressed sub-frame 358) has a size '1', which may indicate a single data block (e.g., 64 bytes), sub-frame 2 (e.g., compressed sub-frame 356) has a size '2' (e.g., 128 bytes), which may indicate two data blocks, sub-frame 3 (e.g., compressed sub-frame 354) has a size '3' (e.g., 192 bytes), which may indicate three data blocks, and sub-frame 4 compressed sub-frame 352) has a size '4' (e.g., 256 bytes), which may indicate four data blocks. In this manner, rather than fetching each compressed sub-frame using a maximum number of blocks (e.g. 4), GPU 112 may cause system memory 110 to fetch four data blocks for compressed sub-frame 352, three data blocks for compressed sub-frame 354, two data blocks for compressed sub-frame 356, and one data block for compressed sub-frame 358.

Figure 4:
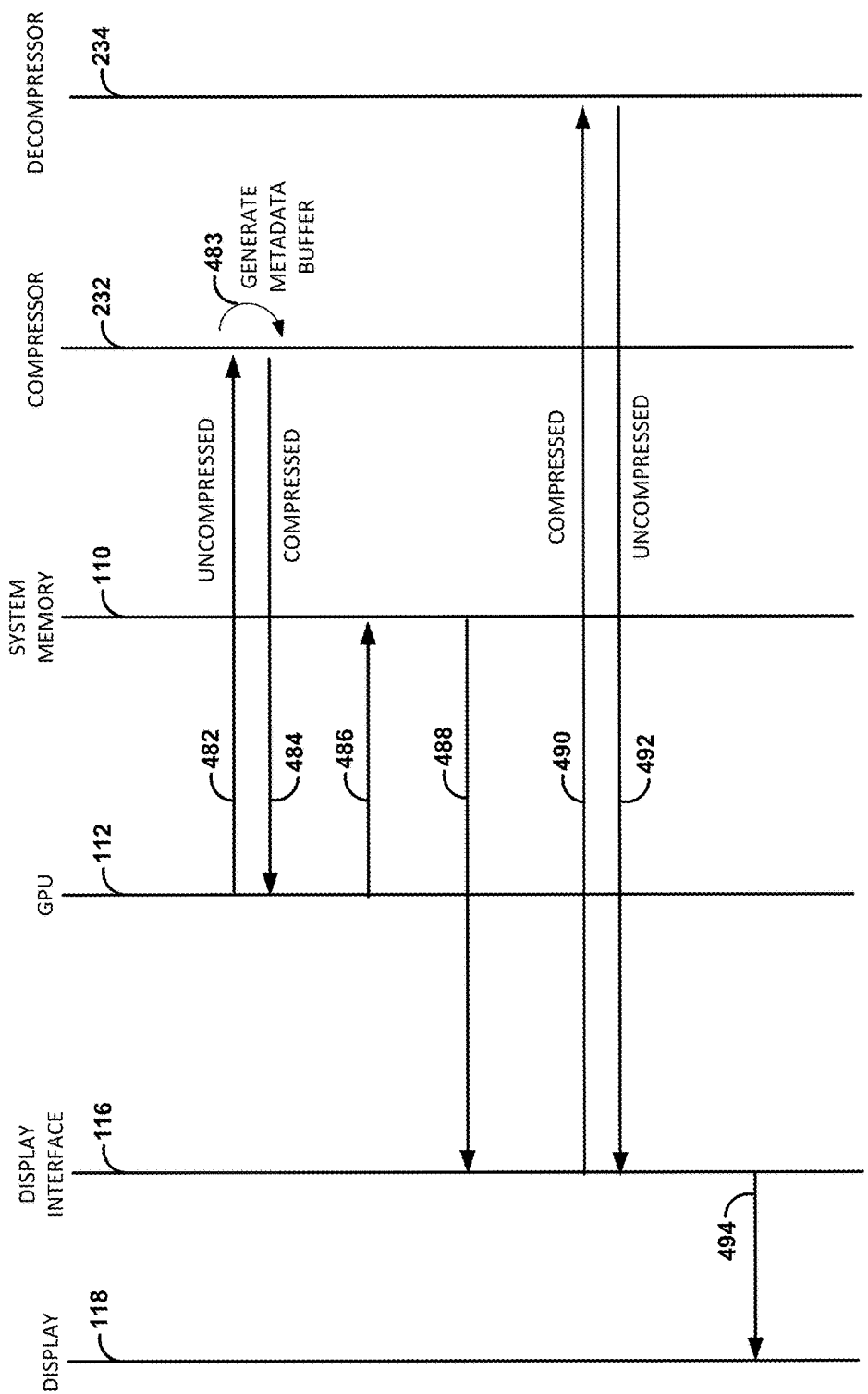
FIG. 4 is an illustration of a GPU preparing image data for display in accordance with one or more example techniques described in this disclosure.

FIG. 4 is an illustration of a GPU 112 preparing image data for display in accordance with one or more example techniques described in this disclosure. FIG. 4 is discussed with computing device 102 of FIGS. 1 and 2 for exemplary purposes only.

In the exemplary techniques illustrated in FIG. 4, GPU 112 outputs, to compressor 232, image data for compression (482). Compressor 232 generates metadata buffer (483) and outputs, to GPU 112, compressed image data (484). GPU 112, outputs to system memory 110, compressed image data for storage at system memory 110 (486). Display interface 116 fetches, from system memory 110, the compressed image data (488). Display interface 116 may output, to decompressor 490, the compressed data (490) and receive, from decompressor 234, uncompressed image data (492). Display interface 116 outputs the uncompressed image data to display 118 (494). In accordance with one or more techniques described herein, systems may be configured to omit fetches from system memory 110 (e.g., 488) and/or writes to system memory (e.g., 486) to reduce a power consumption of the system compared with systems that fetch image data from system memory 110 (e.g., 488) and/or writes to system memory (e.g., 486).

Figure 5:
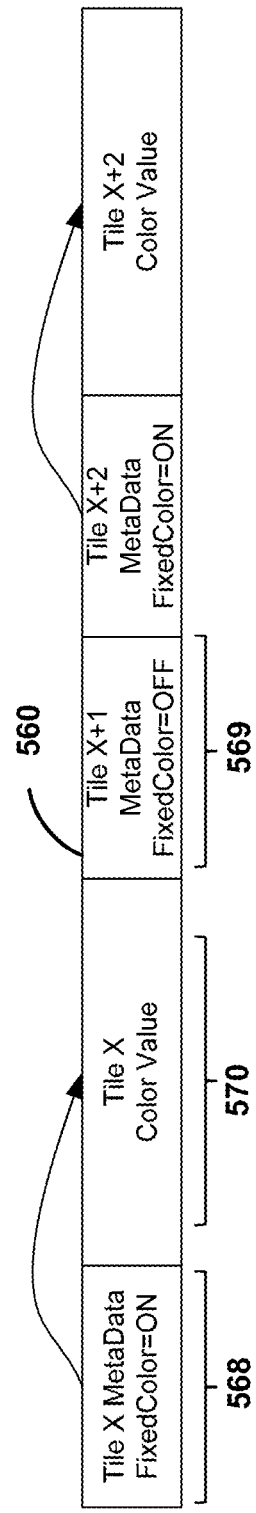
FIG. 5 is an illustration of a first exemplary metadata buffer in accordance with one or more example techniques described in this disclosure.

FIG. 5 is an illustration of a first exemplary metadata buffer 560 in accordance with one or more example techniques described in this disclosure. FIG. 5 is discussed with computing device 102 of FIGS. 1 and 2 for exemplary purposes only. In the example of FIG. 5, metadata buffer 560 for rendering a frame includes an embedded color value 570. Metadata buffer 560 may be included in system memory 110 of FIGS. 1 and 2. For instance, in response to determining that all pixels in a sub-frame (e.g., tile X) have a fixed color (e.g., a RGBa color), GPU 112 may create a metadata buffer entry in metadata buffer 560 for the sub-frame that includes an indication 568 that the corresponding sub-frame has a fixed color and GPU 112 may include embedded color value 570 in metadata buffer 560 that indicate the fixed color value. Embedded color value 570 may be 8 bits, 4 bits, or another quantity of bits.

In some examples, GPU 112 may store the color value indicated by embedded color value 570 in system memory 110, for instance, to permit devices that are not configured to use embedded color value 570 to determine the fixed color value for a sub-frame corresponding to the entry in metadata buffer 560. In some examples, GPU 112 may refrain from storing the color value indicated by embedded color value 570 in system memory 110, for instance, to reduce a quantity of fetches performed by GPU 112, thereby reducing a power consumption of GPU 112. For instance, GPU 112 may determine image data according to embedded fixed color values in the metadata buffer stored in system memory 110. More specifically, GPU 112 may assign embedded color value 570 to each pixel of a sub-frame (e.g., tile X).

In the example of FIG. 5, metadata buffer 560 for rendering a frame may omit embedding a color value in metadata buffer 560 for sub-frames that are not a fixed color. For instance, in response to determining that not all pixels in a sub-frame (e.g., tile X+1) has a fixed color (e.g., fixed RGBa color), GPU 112 may create a metadata buffer entry for the sub-frame (e.g., tile X+1) in metadata buffer 560 that includes an indication 569 that the sub-frame does not include a fixed color and GPU 112 may refrain from embedding a color value in metadata buffer 560 for the sub-frame.

Figure 6:
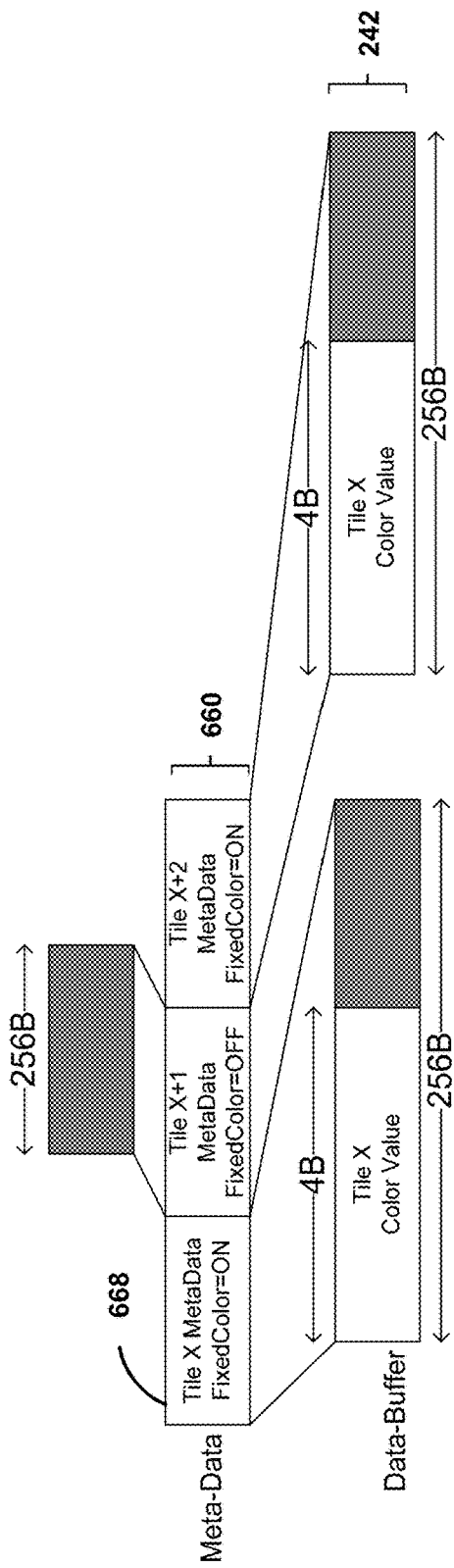
FIG. 6 is an illustration of a second exemplary metadata buffer in accordance with one or more example techniques described in this disclosure.

FIG. 6 is an illustration of a second exemplary metadata buffer 660 in accordance with one or more example techniques described in this disclosure. FIG. 6 is discussed with computing device 102 of FIGS. 1 and 2 for exemplary purposes only. Metadata buffer 660 may be included in system memory 110 of FIGS. 1 and 2. In the example of FIG. 6, GPU 112 may indicate, using a bit 668, in metadata buffer 660, that all pixels in a sub-frame (e.g., tile X) have a fixed color. In the example of FIG. 6, an access block size of data buffer 242 is 256 bytes and the fixed color is 4 bytes.

Figure 7:
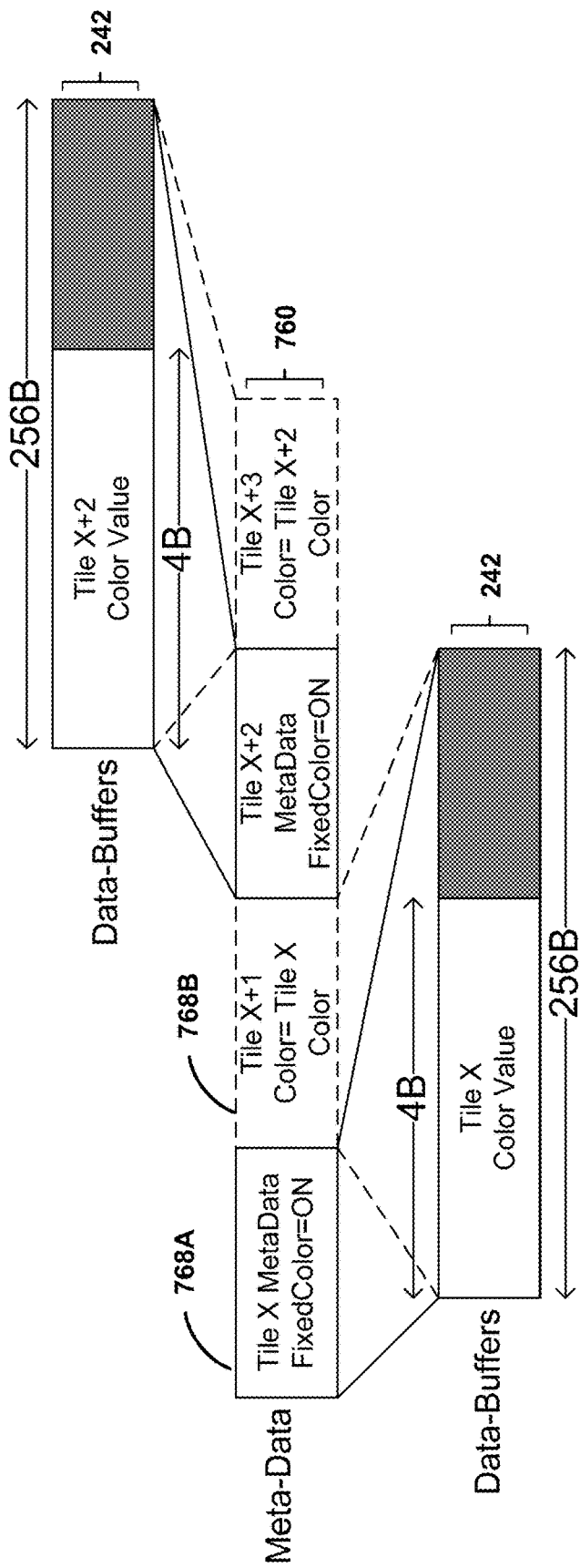
FIG. 7 is an illustration of a third exemplary metadata buffer in accordance with one or more example techniques described in this disclosure.

FIG. 7 is an illustration of a third exemplary metadata buffer 760 in accordance with one or more example techniques described in this disclosure. FIG. 7 is discussed with computing device 102 of FIGS. 1 and 2 for exemplary purposes only. Metadata buffer 760 may be included in system memory 110 of FIGS. 1 and 2. In the example of FIG. 7, metadata buffer 760 for rendering a first sub-frame (e.g., tile X−1) indicates, using an embedded pointer 768B, that a second sub-frame (e.g., tile X) of a set of sub-frames for a frame includes a color pattern, fixed color value, or combination thereof corresponding to the color pattern, fixed color value, or combination thereof included in the first sub-frame. For instance, GPU 112 may indicate, using embedded pointer 768A, in metadata buffer 760, that all pixels in a first sub-frame (e.g., tile X) have a fixed color. In the example of FIG. 7, GPU 112 may indicate, using an embedded pointer 768B, in metadata buffer 760, that all pixels in a second sub-frame (e.g., tile X+1) have the fixed color of the first frame (e.g., tile X). For instance, embedded pointer 768B (e.g., a fifth bit in a byte) may indicate that image data for a current sub-frame (e.g., tile X+1) is similar to a previous sub-frame (e.g., tile X). As such, GPU 112 may retrieve, from system memory 110, image data for the prior sub-frame that indicates the color pattern, fixed color value, or combination thereof, store the image data for the prior sub-frame in cache 114, and determine the image data for rendering the current sub-frame according to the image data buffered in cache 114. For instance, GPU 112 may assign the image data for the previous sub-frame (e.g., tile X) to the current sub-frame (e.g., tile X+1).

FIG. 8 is an illustration of a fourth exemplary metadata buffer 860 in accordance with one or more example techniques described in this disclosure. FIG. 8 is discussed with computing device 102 of FIGS. 1 and 2 for exemplary purposes only. Metadata buffer 860 may be included in system memory 110 of FIGS. 1 and 2. In the example of FIG. 8, metadata buffer 860 may include portions 870 that indicate a fixed color value. For instance, portions 870A and 870B may each be 4-bit portions of a byte representing a fixed color value.

GPU 112 may determine a fixed color value for a sub-frame based on portions 870. For instance, GPU 112 may determine a fixed color value for sub-frame 1 by combining a first 4-bit portion stored in portion 870A for sub-frame 1 and a second 4-bit portion stored in portion 870B for sub-frame 2 to form a byte representing a fixed color value. It should be understood that a portion may be less than half of a fixed color value. For instance, GPU 112 may combine portions 870 corresponding to sub-frames 1-3, 1-4, or 1-n to determine a complete fixed color value that may be used to render each of the multiple sub-frames. In the example, GPU 112 may assign the complete fixed color value to each pixel of a sub-frame. For instance, GPU 112 may assign the complete fixed color value indicated by portions 870 to each pixel of sub-frame 1, sub-frame 2, sub-frame 3, and sub-frame 4.

In some examples, rather than using 8 bits to represent a fixed color value in metadata buffer 860, the fixed color value may be approximated. For example, the fixed color data may indicate a portion (e.g., half) of a color space. For instance, GPU 112 may determine a fixed color value using 4 bits. In some examples, the fixed color value may include only the RGB of a fixed color value and may omit an alpha value. For instance, the fixed color data may indicate only three RGB bits. In some examples, the fixed color value may include the RGB of a fixed color value and include only an alpha value of '0' and '1'. In some examples, the bits used to represent a fixed color may be positioned in metadata buffer 860 to permit backward compatibility. For instance, the bits used to represent a fixed color may be positioned outside bits [3:1], which may be used to indicate size, type, or other data, in metadata buffer 860.

In some examples, metadata buffer 860 may indicate an alpha value for a sub-frame. For instance, metadata buffer [5:4]=10b (e.g., a '10' pattern at bit positions 4 and 5 of metadata buffer 860) may indicate that alpha values for all the pixels in a corresponding sub-frame are uniformly 0xFF (e.g., 1.0 when translated to 1 0.0 . . . 1.0 color space). Said differently, metadata buffer [5:4]=10b may indicate a solid compressed w_alpha=1 8:1 compressed state for a corresponding sub-frame. Metadata buffer [5:4] 10b may not indicate RGB values, which may not be uniform, of pixels in the corresponding sub-frame. Alpha values may be useful for a display sub-system that fetches multiple surface that overlap each other. For instance, if a front surface (e.g., a sub-frame) is known to be opaque. GPU 112 may refrain from fetching data associated with underlying surfaces (e.g., sub-frames) as such surfaces may not be visible. In the example, GPU 112 may store bit 5 and interpret 5:4==10b as 8:1 compressed or converter [5:4]==10b to 8:1 compress code in [4:2] prior to storing metadata buffer 860 is system memory 110. As such, an RGB value may be stored in bits [7:6] and [3:0] of four consecutive blocks. In the example, the alpha value may be predefined as 0xFF. Accordingly, GPU 112 may use an encoded solid color if in all 4 blocks [5:4]==10 bits. An isolated [5:4]==10b would simply indicate '8:1 compressed'.

FIG. 9 is an illustration of a fifth exemplary metadata buffer 960 in accordance with one or more example techniques described in this disclosure. FIG. 9 is discussed with computing device 102 of FIGS. 1 and 2 for exemplary purposes only. Metadata buffer 960 may be included in system memory 110 of FIGS. 1 and 2. In the example of FIG. 9, metadata buffer 960 for rendering a first sub-frame indicates that a second sub-frame of a set of sub-frames for a frame includes a color pattern, fixed color value, or combination thereof corresponding to the color pattern, fixed color value, or combination thereof included in the first sub-frame. More specifically, as shown, indicator 970A indicates that a geometrically adjacent (e.g., a next or previous sub-frame) includes a color pattern, fixed color value, or combination thereof corresponding to a color pattern, fixed color value, or combination thereof included in the sub-frame for the entry. Similarly, indicator 970B indicates that a previous sub-frame includes a color pattern, fixed color value, or combination thereof corresponding to a color pattern, fixed color value, or combination thereof included in the sub-frame for the entry. Said differently, in response to determining that a next sub-frame (e.g., sub-frame 2) includes a color pattern, fixed color value, or combination thereof corresponding to a current color pattern (e.g., sub-frame 1), GPU 112 may include, in metadata buffer 960, indicator 970A. Similarly, in response to determining that a previous sub-frame (e.g., sub-frame 1) includes a color pattern, fixed color value, or combination thereof corresponding to a current color pattern (e.g., sub-frame 2), GPU 112 may include, in metadata buffer 960, indicator 970B.

In some examples, GPU 112 may determine, based on metadata buffer 960 image data for a first sub-frame according to image data for a second sub-frame. For instance, rather than fetching image data for sub-frame 2 from system memory 110, GPU 112 may access image data in cache 114 for rendering sub-frame 1, More specifically, GPU 112 may assign the image data for sub-frame 2 to sub-frame 1. Additionally, or alternatively, rather than fetching image data for sub-frame 1 from system memory 110, GPU 112 may access image data in cache 114 for rendering sub-frame 2. More specifically, GPU 112 may assign the image data for sub-frame 1 to sub-frame 2.

GPU 112 may associate a sub-frame with a memory address that indicates a location of image data for rendering the sub-frame in system memory 110. For example, GPU 112 may add and/or modify an entry in a table stored in cache 114 and/or system memory 110 that includes an indication of the sub-frame and an indication of a memory address. For instance, GPU 112 may associate a sub-frame with a memory address that indicates a location of image data for rendering the sub-frame is stored in system memory 110 by adding and/or modify an entry in a table stored in cache 114 and/or system memory 110 that includes an identifier for the sub-frame and a memory address that indicates a location in system memory 110 where image data for rendering the sub-frame is stored.

GPU 112 may store image data for rendering a sub-frame in cache 114 and index the image data by a memory address that indicates a location of image data for rendering the sub-frame in system memory 110. For example, in response to fetching image data for a sub-frame from system memory 110, GPU 112 may store the fetched image data for the sub-frame in cache 114 and index the fetched image data for the sub-frame according to the memory address that indicates a location of image data for rendering the sub-frame in system memory 110.

Rather than fetching image data from system memory 110, GPU 112 may be configured to fetch the image data from cache 114 when the image data is available in cache 114. For example, in response to receiving an instruction to fetch image data for a sub-frame from the memory address of system memory 110, GPU 112 may determine whether image data stored in cache 114 is indexed by the memory address. For instance, GPU 112 may determine whether image data is stored in cache 114 before fetching the image data from system memory 110. In response to determining that image data stored in cache 114 is indexed by the memory address (e.g., a "cache hit"), GPU 112 may access the image data stored in cache 114 that is indexed by the memory address rather than performing a fetch from system memory 110.

In some examples, GPU 112 tray determine whether metadata buffer 960 indicates that a first sub-frame corresponds to a second sub-frame. For example, in response to determining that indicator 970A indicates that the first sub-frame includes a color pattern, fixed color value, or combination thereof corresponding to a color pattern, fixed color value, or combination thereof included in the second first sub-frame. GPU determines that metadata buffer 960 indicates that the first sub-frame corresponds to the second sub-frame and/or that the second sub-frame corresponds to first second sub-frame.

GPU 112 may assign image data for a first sub-frame to a second sub-frame. For example, in response to determining that metadata buffer 960 indicates that the first sub-frame corresponds to the second sub-frame, GPU 112 may assign image data for the first sub-frame to the second sub-frame by modifying a first memory address of image data for rendering the first sub-frame to match (e.g., be identical to) a second memory address of image data for rendering the second sub-frame. In the example, GPU 112 may have previously fetched image data for rendering the second sub-frame from system memory 110, stored the fetched image data for the second sub-frame in cache 114, and indexed the fetched image data for the second sub-frame according to the second memory address that indicates a location of the image data for rendering the second sub-frame in system memory 110. As such, in response to determining that the image data for rendering the second sub-frame is stored in cache 114 and indexed by the modified first memory address, which matches the second memory address, GPU 112 may retrieve the image data for rendering the second sub-frame from cache 114 and indexed by the modified first memory address instead of from system memory 110. In the example, GPU 112 may determine the image data for rendering the first sub-frame according to the image data for rendering the second sub-frame that is stored in cache 114 and indexed by the modified first memory address. In this manner, rather than fetching image data for rendering the first sub-frame from system memory 110, GPU 112 may determine the image data for rendering the first sub-frame using image data stored in cache 114.

FIG. 10 is an illustration of a sixth exemplary metadata buffer 1060 in accordance with one or more example techniques described in this disclosure. FIG. 10 is discussed with computing device 102 of FIGS. 1 and 2 for exemplary purposes only. Metadata buffer 1060 may be included in system memory 110 of FIGS. 1 and 2. In the example of FIG. 10, metadata buffer 1060 for rendering a first sub-frame indicates that a second sub-frame of a set of sub-frames for a frame includes a color pattern, fixed color value, or combination thereof corresponding to the color pattern, fixed color value, or combination thereof included in the first sub-frame. More specifically, as shown, indicator 1070B points to another sub-frame that includes a color pattern, fixed color value, or combination thereof corresponding to the color pattern, fixed color value, or combination thereof included in the instant sub-frame. For instance, indicator 10709 points to sub-frame 1 that includes a color pattern, fixed color value, or combination thereof corresponding to the color pattern, fixed color value, or combination thereof included in sub-frame 2.

Indicators 1070 may indicate a relative position of a sub-frame. For example, indicators 1070 may indicate a relative position of a sub-frame along a scan order (e.g., a raster scan order). For instance, indicator 1070B may indicate a relative position of one sub-frame back from sub-frame 2 along a scan order of sub-frame 1, followed by sub-frame 2, followed by sub-frame 3, and so forth. Said differently, in response to determining that a position (e.g., 1 sub-frame back along a scan order) of a sub-frame relative to a sub-frame includes a color pattern, fixed color value, or combination thereof corresponding to the color pattern, fixed color value, or combination thereof included in the sub-frame of the entry, GPU 112 may include, in metadata buffer 1060, indicator 10709. Similarly, indicator 1070C indicates a position (e.g., 2 sub-frames back along a scan order) of a sub-frame relative to sub-frame that includes a color pattern, fixed color value, or combination thereof corresponding to the color pattern, fixed color value, or combination thereof included in the sub-frame of the entry. Said differently, in response to determining that a position (e.g., 2 sub-frames back along the scan order) of a sub-frame relative to sub-frame includes a color pattern, fixed color value, or combination thereof corresponding to the color pattern, fixed color value, or combination thereof included in the sub-frame of the entry, GPU 112 may include, in metadata buffer 1060, indicator 1070C.

In some examples, indicator 1070 may be used to track neighborhood sub-frames linearly. For instance, if sub-frames are within a row of a frame, a later sub-frame may have a color pattern, fixed color value, or combination thereof that is the same as another (e.g., a first) sub-frame of the row. In the example, indicator 1070 may be a single bit indicating that a corresponding sub-frame does not have data buffered in system memory 110. Alternatively, as shown, indicator 1070 may indicate how many sub-frames need to be traced back for retrieving image data for a sub-frame. As such, GPU 112 may determine a pointer for retrieving image data for a sub-frame according to indicator 1070. For instance, sub-frame 1 may not match other frames because GPU 112 may process sub-frame 1 first, sub-frame 2 may match sub-frame 1, sub-frame 3 may match sub-frames 1 and 2, sub-frame 4 may match sub-frames 3, 2, and 1, and so forth.

Figure 11:
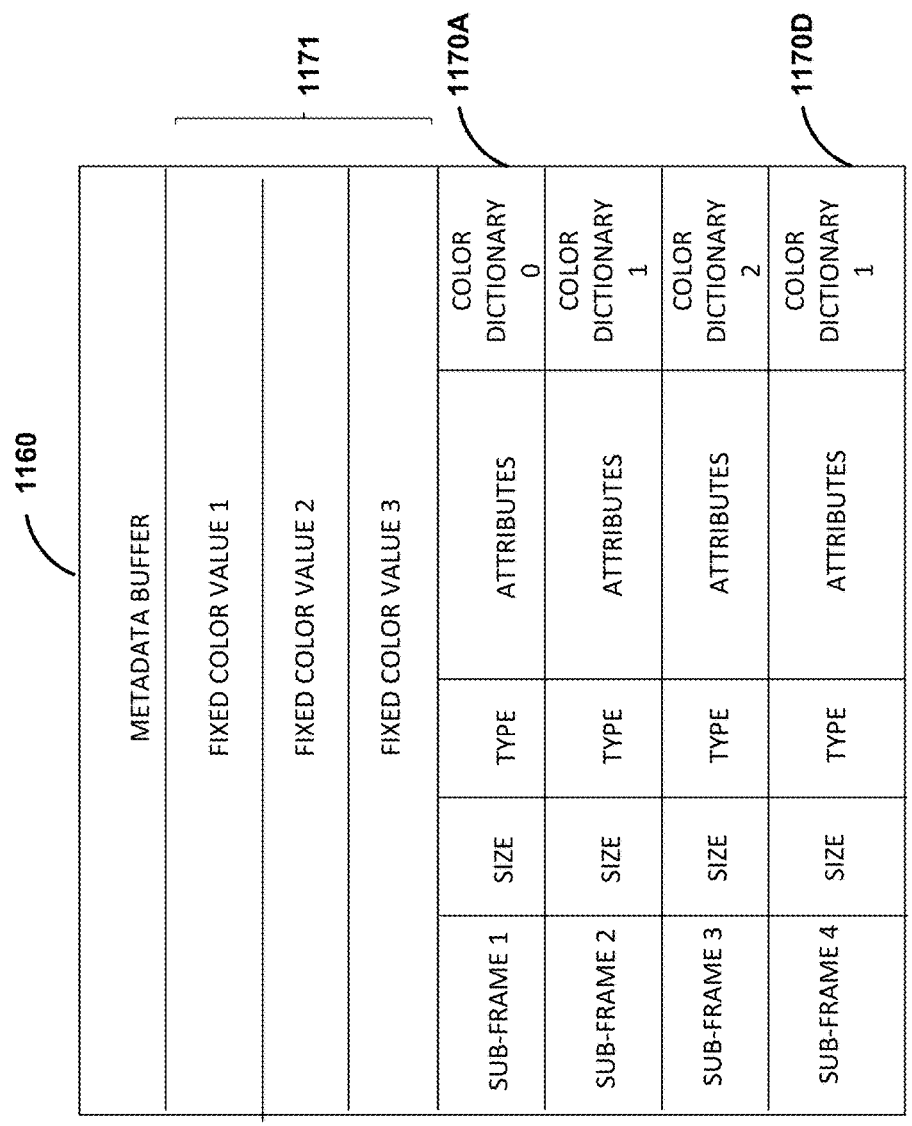
FIG. 11 is an illustration of a seventh exemplary metadata buffer in accordance with one or more example techniques described in this disclosure.

FIG. 11 is an illustration of a seventh exemplary metadata buffer 1160 in accordance with one or more example techniques described in this disclosure. FIG. 11 is discussed with computing device 102 of FIGS. 1 and 2 for exemplary purposes only. Metadata buffer 1160 may be included in system memory 110 of FIGS. 1 and 2. In the example of FIG. 11, metadata buffer 1160 for rendering a sub-frame includes an indicator 1170A that indicates that the sub-frame corresponds to an entry in a color dictionary 1171. Said differently, in response to determining that image data for rendering the sub-frame corresponds to an entry in a color dictionary 1171, GPU 112 may include, in metadata buffer 1160, indicator 1170A.

In some examples, a portion of metadata buffer 1160 may be configured to store one or more fixed color values in color dictionary 1171. For instance, metadata buffer 1160 may be configured to store 8 fixed color values. In the example, in response to GPU 112 determining that a sub-frame includes a fixed color value that has not been stored in color dictionary 1171 of metadata buffer 1160, GPU 112 may store the fixed color values for the sub-frame in metadata buffer 1160 in a slot of color dictionary 1171 and set indicator 1170 to indicate the slot containing the fixed color values. For instance, a fixed color value may be stored in a first slot ('1') of color dictionary 1171 and indicator 1170 may indicate '001'. In the example, GPU 112 may store a number of fixed color values corresponding to a number of slots in color dictionary 1171. For instance, in those instances where color dictionary 1171 includes 8 slots and indicator 1170 includes 3 bits, GPU 112 may store the first 8 unique fixed color values in color dictionary 1171.

In some examples, GPU 112 generates, prior to determining image data for rendering a first sub-frame, image data corresponding to an entry in color dictionary 1171 according to image data for a second sub-frame of the set of sub-frames for the frame. For instance, GPU 112 generates, prior to determining image data for rendering a sub-frame 4, image data corresponding to an entry (e.g., color dictionary '1') in color dictionary 1171 according to image data for sub-frame 2 of the set of sub-frames for the frame. In the example, in response to determining that the current sub-frame 4 corresponds to an entry (e.g., color dictionary '1') in the color dictionary, GPU 112 may include, in metadata buffer 1160, an indicator 1170D that indicates that a sub-frame (e.g., sub-frame 4) corresponds to an entry in a color dictionary (e.g., color dictionary '1'). In the example, GPU 112 may determine the image data for rendering the first sub-frame (e.g., sub-frame 4) by determining the image data for rendering the first sub-frame according to the image data corresponding to the entry in the color dictionary (e.g., color dictionary '1'). GPU 112 may be configured to fill color dictionary 1071 with fixed color values according to an order for rending sub-frames in a frame. Said differently, GPU 112 may generate color dictionary 1071 according to a first N fixed color values of sub-frames, where N is a quantity of slots in color dictionary 1071.

In some examples, GPU 112 may generate color dictionary 1171 according to image data for sub-frames of a previous frame. For instance, GPU 112 generates, prior to determining the image data for rendering a current frame, color dictionary 1171 according to image data for one or more sub-frames of a previous frame. For instance, GPU 112 stores a first fixed color value for rendering a first sub-frame of the previous frame in fixed color value '1' of color dictionary 1171, a second fixed color value for rendering a second sub-frame of the previous frame in fixed color value '2' of color dictionary 1171, and so on. In some examples, GPU 112 may store N number of fixed color values from a previous frame in color dictionary 1071. In some instances, GPU 112 may store N number of fixed color values from a previous frame in color dictionary 1071 that are the most frequently used fixed color values of the previous frame. As such, GPU 112 may avoid storing, in color dictionary 1071, fixed color values that are infrequently used but processed by GPU 112 early in a frame.

Figure 12:
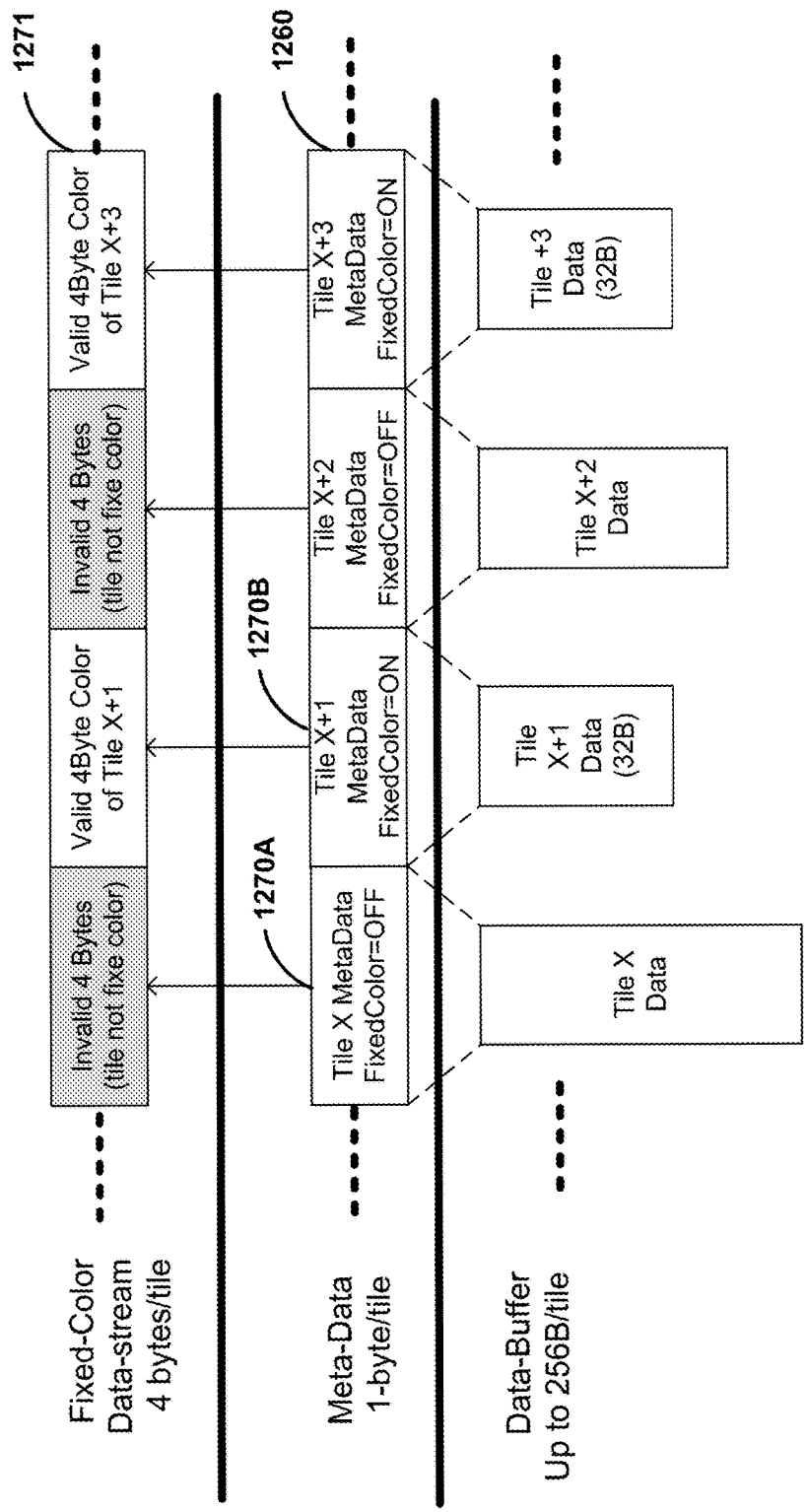
FIG. 12 is an illustration of an eighth exemplary metadata buffer in accordance with one or more example techniques described in this disclosure.

FIG. 12 is an illustration of an eighth exemplary metadata buffer 1260 in accordance with one or more example techniques described in this disclosure. FIG. 12 is discussed with computing device 102 of FIGS. 1 and 2 for exemplary purposes only. Metadata buffer 1260 may be included in system memory 110 of FIGS. 1 and 2. In the example of FIG. 12, metadata buffer 1260 for rendering a sub-frame includes an indication of whether a fixed color data stream 1271 indicates a fixed color corresponding to the entry. For instance, indicator 1270B may indicate that a 4-byte color is stored in fixed color data stream 1271. Said differently, in response to determining that a sub-frame includes a fixed color value, GPU 112 may store the fixed color value in fixed color data stream 1271 and include, in metadata buffer 1260, indicator 1270B. In the example, GPU 112 may retrieve, from cache 114, the fixed color data stream 1271. For instance, as shown, fixed color data stream 1271 includes fixed color values for sub-frames (e.g., tiles) X+1 and X+3. In the example, however, indicator 1270A indicates that sub-frame X does not include a fixed color value stored in fixed color data stream 1271. Said differently, in response to determining that a sub-frame does not include a fixed color value, GPU 112 may include, in metadata buffer 1260, indicator 1270A. In the example, GPU 112 may retrieve, from the data buffer 242, image data for sub-frame X.

In some examples, fixed color data stream 1271 may be stored in system memory 110. In the example, GPU 112 may retrieve, from system memory 110, fixed color data stream 1271, and stores the fixed color data stream 1271 in cache 114. As such, a single fetch from system memory 110 may store image data for multiple sub-frames. For instance, a 32-byte fetch may retrieve image data for 8 different sub-frames, where each sub-frame has an image data of 4 bytes. As such, GPU 112 may indicate in fixed color data stream 1271 different colors and any variation of alpha for each of the 8 different sub-frames. In this manner, if all 8 sub-frames have a fixed color value or fixed color values, a compression ratio of 1:64 may be achieved. If less than all 8 sub-frames have a fixed color value or fixed color values, a compression ratio of between 1:4 and 1:64 may be achieved (i.e., no rounding down of compression ratio if less than 8 sub-frames have fixed color values. If only 1 sub-frame of the 8 sub-frames has a fixed color value, GPU 112 may be configured to refrain from fetch fixed color data stream 1271.

In some instances, GPU 112 may achieve a 32:2048 or a 32:1024 compression (1:64 and 1:32) when 8 or 4 sub-frames in a geometric order are of the same color when using fixed color data stream 1271. In some instance, GPU 112 may achieve a 1:4 compression ratio (MAL=32B) or a 1:8 ratio (MAL=64B). Systems using fixed color data stream 1271 may have a better compression ratio without changing a size of metadata buffer 1260 compared with system that omit fixed color data stream 1271.

It should be understood that techniques using fixed color data stream 1271 may be configured to support all fixed color values and alpha values. In some instances, techniques using fixed color data stream 1271 may have a compression ratio that is proportional to a number of fixed color sub-frames.

FIG. 13 is an illustration of a ninth exemplary metadata buffer 1360 in accordance with one or more example techniques described in this disclosure. FIG. 13 is discussed with computing device 102 of FIGS. 1 and 2 for exemplary purposes only. Metadata buffer 1360 may be included in system memory 110 of FIGS. 1 and 2. In the example of FIG. 13, metadata buffer 1360 for rendering a first sub-frame includes a similar sub-frame indicator 1370 that indicates a sub-set of sub-frames 1369 are associated with a color pattern and/or fixed color value. As used herein, a sub-frame being associated with a color pattern may refer to instances where the sub-frame has identical image data with the color pattern. It should be understood that a color pattern may not be uniform or solid.

GPU 12 may determine whether sub-frames have identical image data. For example, GPU 112 may generate, for image data for each sub-frame, a 'signature' (e.g., of 64 bits) that characterizes the contents of the respective sub-frame. If a subsequent sub-frame's signature (e.g., in a group of 4) matches the initial signature, GPU 112 may indicate (e.g. in metadata 1360) that the color patterns are similar (e.g., identical).

GPU 112 may process the sub-set of sub-frames 1369 using a first fetch from system memory 110 and prevent reading of subsequent sub-frames. For instance, GPU 112 may determine multiple sub-frames that are indicated by similar sub-frame indicator 1370 as having similar sub-frames and GPU 112 may randomly process (e.g., not processed in predetermined scan sequence) the determined sub-frames (e.g., sub-frames 1369). As used herein, sub-frames may be similar when the sub-frames have corresponding color patterns and/or corresponding fixed color values. For example, GPU 112 may process sub-frame 1 by storing image data to system memory 110. In the example, in response to determining that sub-frame 4 is similar to sub-frame 1, GPU 112 may process sub-frame 4 by indicating in similar sub-frame indicator 1370 that sub-frame 4 is similar to sub-frame 1. As such, GPU 112 may process sub-frame 1 by fetching image data from system memory 110 and store the fetched image data into cache 114 such that sub-frame 4 may be rendered using the previously fetched image data in cache 114 rather than image data in system memory 110. In this manner, systems using similar sub-frame indicator 1370 may reduce a number of fetches from system memory 110 and increase compression ratio due to reduced padding.

In an exemplary technique, GPU 112 may render sub-frame 1 by storing image data for sub-frame 1 in system memory 110. In response to determining that sub-frame 4 is similar to sub-frame 1 (e.g., sub-frame 4 has image data corresponding to image data for sub-frame 1), GPU 112 indicates, using similar sub-frame indicator 1370, that sub-frame 4 is similar to sub-frame 1. In response to indicating that sub-frame 4 is similar to sub-frame 1, GPU 112 may refrain from writing image data for sub-frame 4 in system memory 110. In some examples, in response to indicating that sub-frame 4 is similar to sub-frame 1, GPU 112 may refrain from fetching image data for sub-frame 4 in system memory 110. In some examples, if any subsequent sub-frame (e.g., sub-frame 5 and 7) is similar to sub-frame 1, GPU 112 may refrain from writing image data for such sub-frames in system memory 110 and/or GPU 112 may refrain from fetching image data for such sub-frames 4 from system memory 110. In this manner, GPU may achieve a compression ratio for image data of 8:1 for a basic case, 16:1 when two sub-frame are similar (e.g., identical), 24:1 when 3 sub-frames are similar, and 32:1 when 4 sub-frames are identical.

Figure 14:
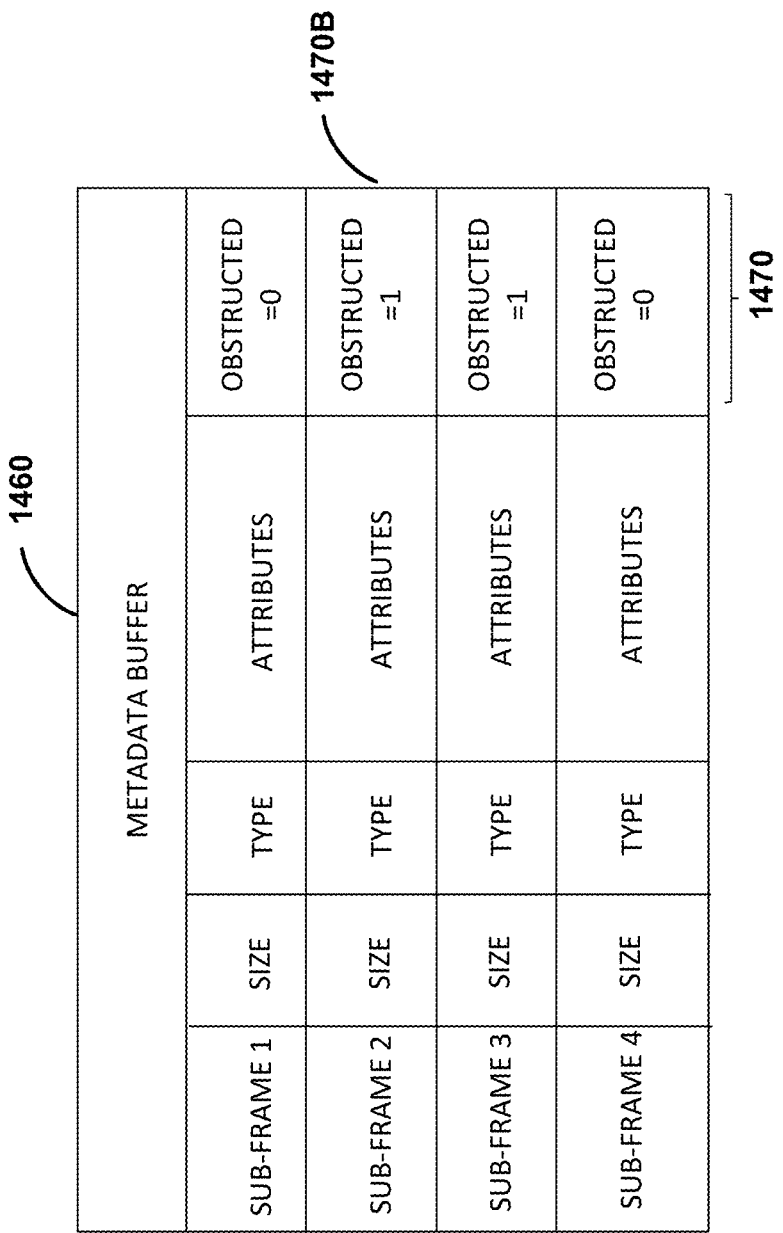
FIG. 14 is an illustration of a tenth exemplary metadata buffer in accordance with one or more example techniques described in this disclosure.

FIG. 14 is an illustration of a tenth exemplary metadata buffer 1460 in accordance with one or more example techniques described in this disclosure. FIG. 14 is discussed with computing device 102 of FIGS. 1 and 2 for exemplary purposes only. Metadata buffer 1460 may be included in system memory 110 of FIGS. 1 and 2. In the example of FIG. 14, metadata buffer 1460 for rendering a first sub-frame includes an obstructed indicator 1470 that indicates when a sub-frame is obstructed (e.g., fully obstructed). For example, in response to determining that obstructed indicator 1470B indicates that sub-frame 2 is fully obstructed, GPU 112 may refrain from fetching image data from system memory 110. More specifically, in response to determining that a sub-frame of a higher (e.g., top) frame is fully opaque and that sub-frame 2 is fully obstructed by the sub-frame of the higher frame, GPU 112 may include indicator 1470B in metadata buffer 1460. In the example, GPU 112 may fetch image data from system memory 110 for rendering a sub-frame for the high frame. In this manner, GPU 112 may refrain from fetching image data for sub-frames for lower frames that are obstructed by an opaque frame.

Figure 15:
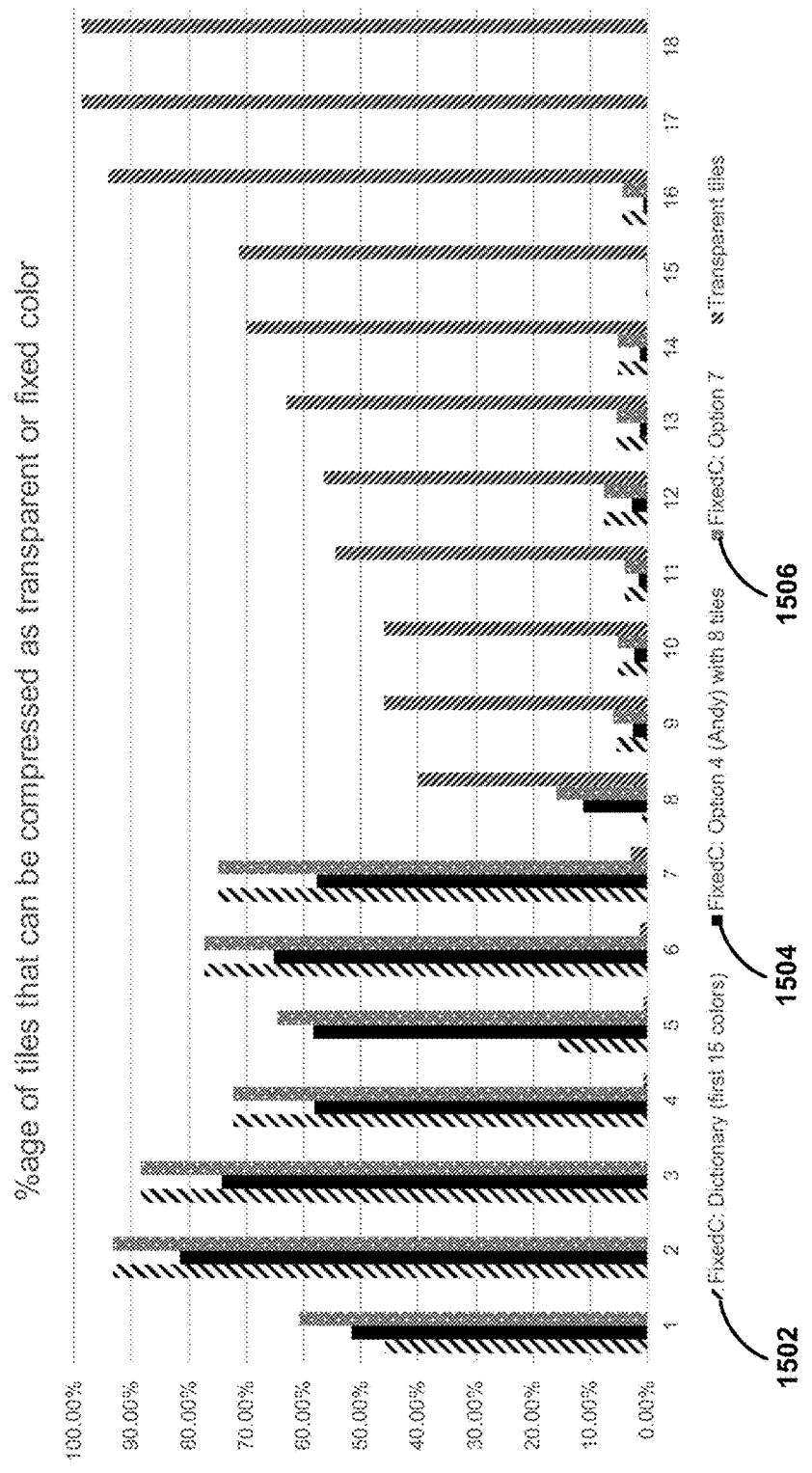
FIG. 15 is a graph illustrating a percentage of sub-frames that may be compressed as transparent or fixed color in accordance with one or more example techniques described in this disclosure.

FIG. 15 is a graph illustrating a percentage of sub-frames that may be compressed as transparent or fixed color in accordance with one or more example techniques described in this disclosure. As shown, a first case 1502 using a color dictionary of a first 15 colors may result in an over 90% reduction in a quantity of fetches. A second case 1504 using a grouping of 8 sub-frames where metadata buffer for each sub-frame indicates a portion of a fixed color may result in an over 80% reduction in a quantity of fetches. A third case 1506 using a fixed color data stream may result in an over 90% reduction in a quantity of fetches.

Figure 16:
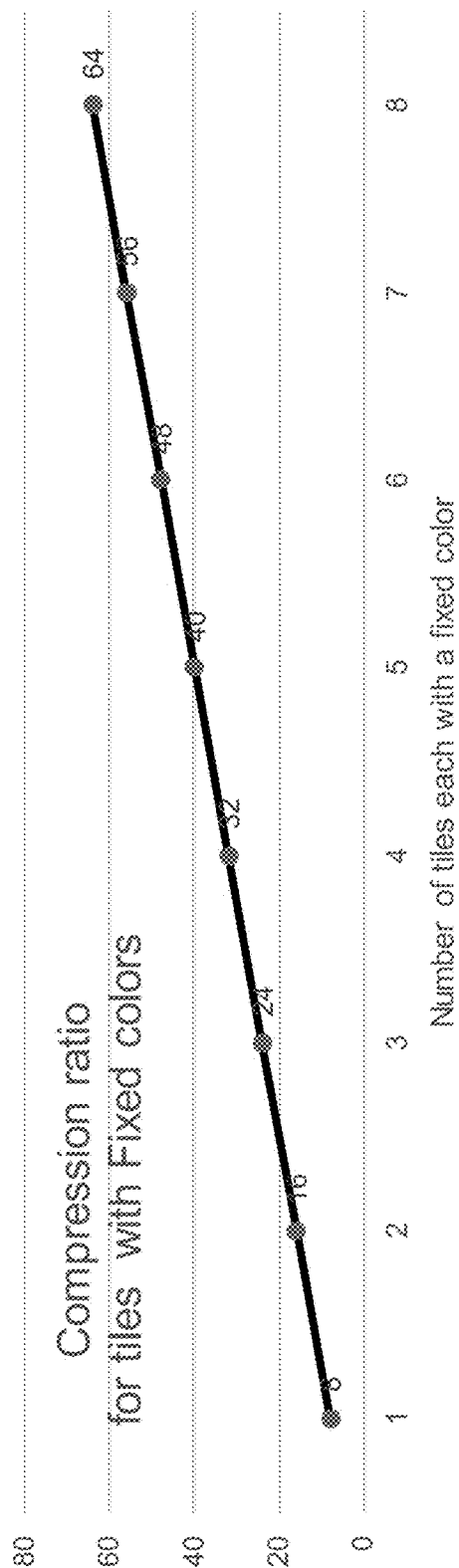
FIG. 16 is a graph illustrating compression ratios for sub-frames with fixed color values in accordance with one or more example techniques described in this disclosure.

FIG. 16 is a graph illustrating compression ratios for sub-frames with fixed color values in accordance with one or more example techniques described in this disclosure. In the example of FIG. 16, a fixed color data stream is fetched from system memory (e.g., system memory 110 of FIGS. 1 and 2). As shown, if eight sub-frames each use an identical fixed color, the resulting compression ratio for the eight sub-frames is 64. If seven sub-frames each use an identical fixed color, the resulting compression ratio for the seven sub-frames is 56. If six sub-frames each use an identical fixed color, the resulting compression ratio for the six sub-frames is 48. If five sub-frames each use an identical fixed color, the resulting compression ratio for the five sub-frames is 40. If four sub-frames each use an identical fixed color, the resulting compression ratio for the four sub-frames is 32. If three sub-frames each use an identical fixed color, the resulting compression ratio for the three sub-frames is 24. If two sub-frames each use an identical fixed color, the resulting compression ratio for the two sub-frames is 16. If one sub-frame has a fixed color, the resulting compression ratio for the one sub-frames is 8.

FIG. 17 is a graph illustrating clustering of color sub-frames in accordance with one or more example techniques described in this disclosure. As shown, most fixed color sub-frames are clustered in groups of 8 sub-frames.

Figure 18:
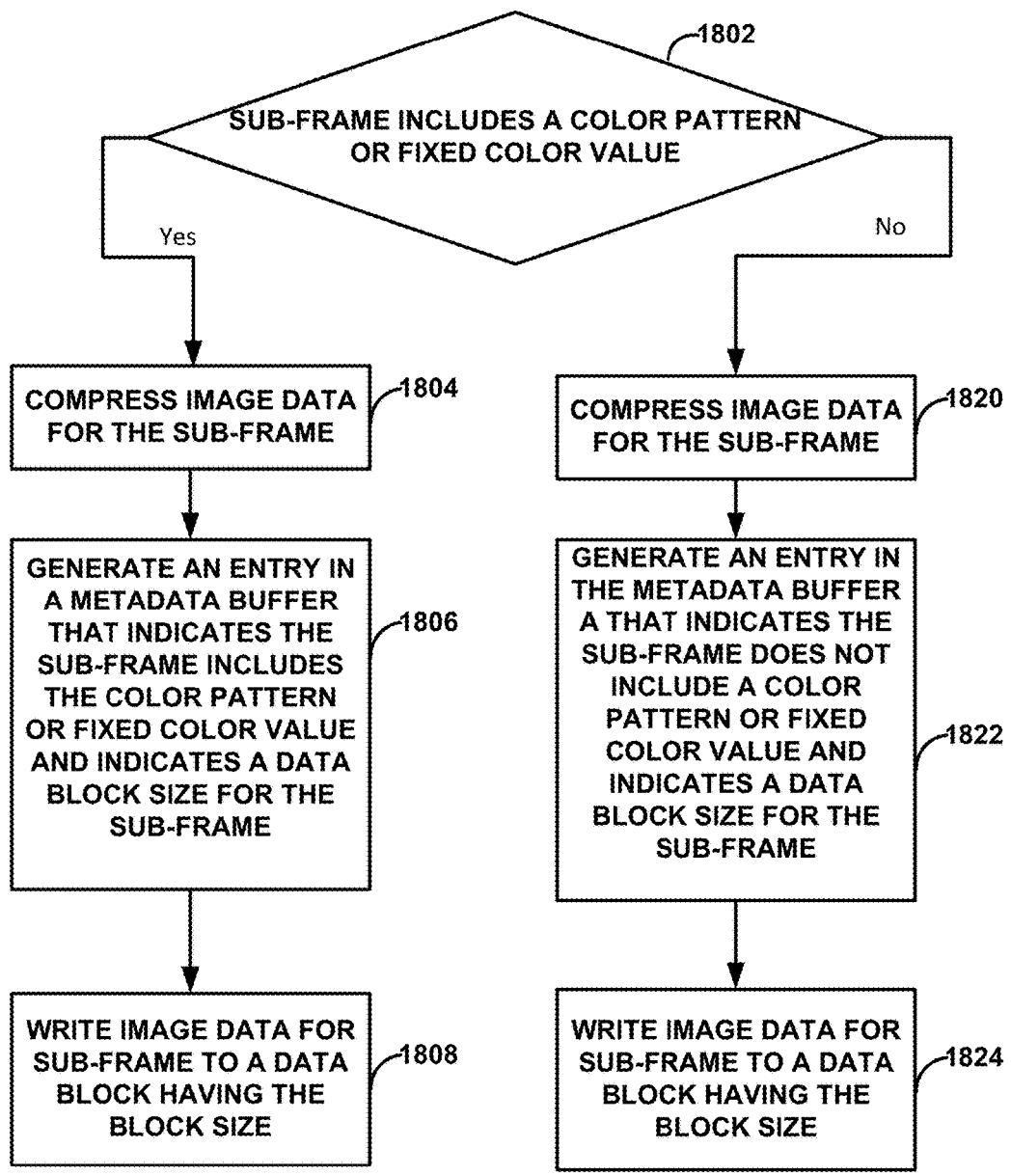
FIG. 18 is a flowchart illustrating an example first method of generating metadata buffer according to techniques described in this disclosure.

FIG. 18 is a flowchart illustrating an example first method of generating metadata buffer according to techniques described in this disclosure. FIG. 18 is discussed with computing device 102 of FIGS. 1 and 2 for exemplary purposes only. Initially, GPU 112 determines whether a sub-frame includes a color pattern or a fixed color value (1802). For instance, GPU 112 may process image data for the sub-frame to determine whether each pixel in the sub-frame is a fixed color value or whether each pixel in the sub-frame may be represented by a color pattern. In response to determining that the sub-frame includes the color pattern or the fixed color value ("Yes" of 1802), compressor 232 may compress image data for the sub-frame (1804). Compressor 232 may generate an entry in metadata buffer 260 that indicates the sub-frame includes the color pattern or fixed color value and indicates a data block size for the sub-frame (1806). For instance, compressor 232 may indicate a data block size according to the compression rate of the image data for the sub-frame and embed a fixed color value in metadata buffer 260. In some instances, compressor 232 may indicate a data block size according to the compression rate of the image data for the sub-frame and indicate, in metadata buffer 260, a pointer to another sub-frame that has a fixed color value or color pattern corresponding to a fixed color value or color pattern for the sub-frame. GPU 112 causes system memory 110 to write image data for the sub-frame to a data block having the block size (1808).

In response, however, to determining that the sub-frame does not include the color pattern or the fixed color value ("No" of 1802), compressor 232 may compress image data for the sub-frame (1820). Compressor 232 may generate an entry in metadata buffer 260 that indicates the sub-frame does not include the color pattern or fixed color value and indicates a data block size for the sub-frame (1822). GPU 112 causes system memory 110 to write image data for the sub-frame to a data block having the block size (1824).

Figure 19:
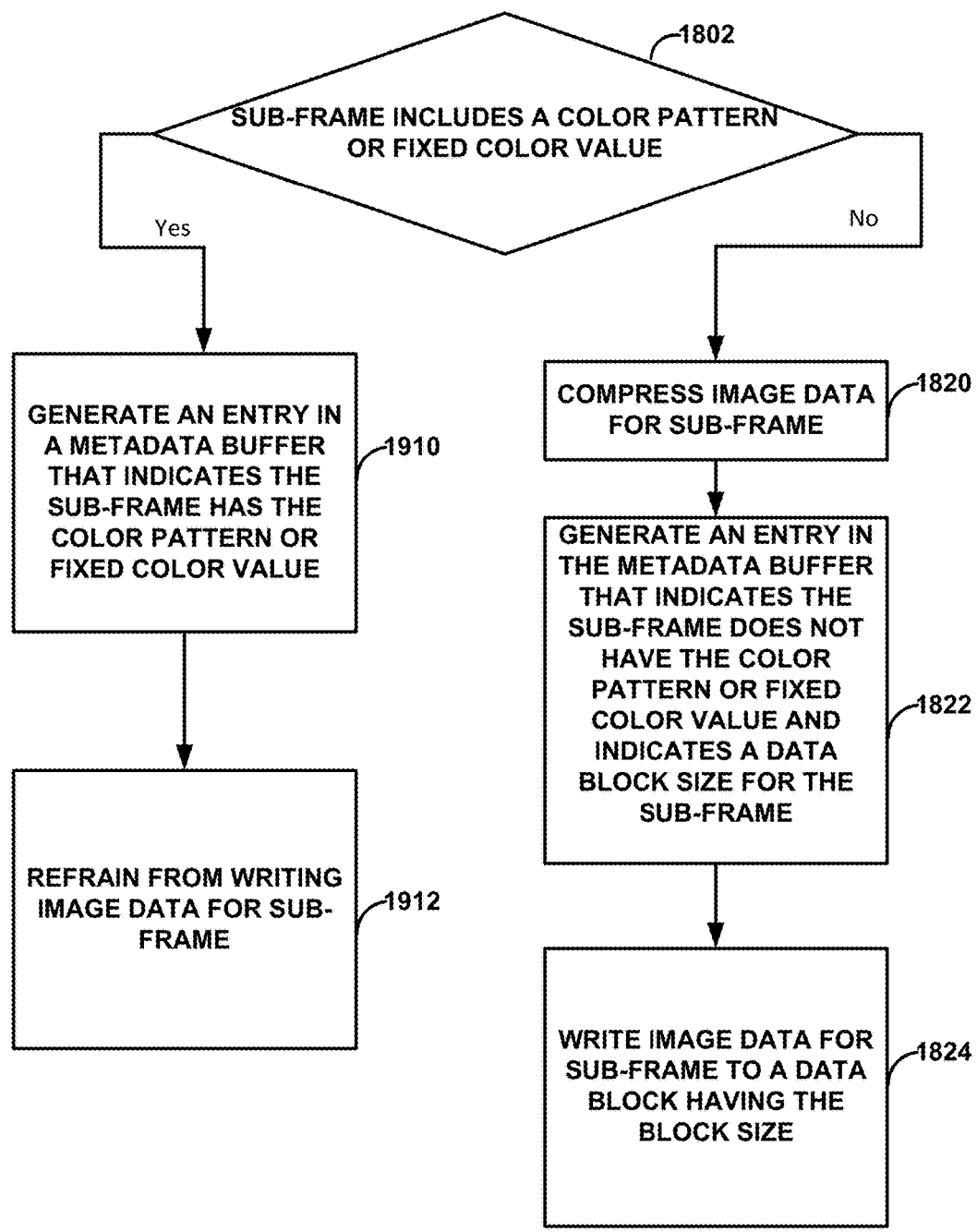
FIG. 19 is a flowchart illustrating an example second method of generating metadata buffer according to techniques described in this disclosure.

FIG. 19 is a flowchart illustrating an example second method of generating metadata buffer according to techniques described in this disclosure. FIG. 19 is discussed with computing device 102 of FIGS. 1 and 2 for exemplary purposes only. FIG. 19 is similar to FIG. 18, except that compressor 232 may generate an entry in metadata buffer that indicates the sub-frame includes the color pattern or fixed color value (1910). For instance, compressor 232 may refrain from indicating a data block size for the sub-frame and embed a fixed color value in the metadata buffer. In some instances, compressor 232 may refrain from indicating a data block size for the sub-frame and indicate another sub-frame that has a fixed color value or color pattern corresponding to a fixed color value or color pattern for the sub-frame. GPU 112 refrains from causing system memory 110 to write image data for the sub-frame to a data block having the block size (1912). In this manner, read/write operations to system memory 110 may be further reduced because image data for the sub-frame is not written to system memory 110.

Figure 20:
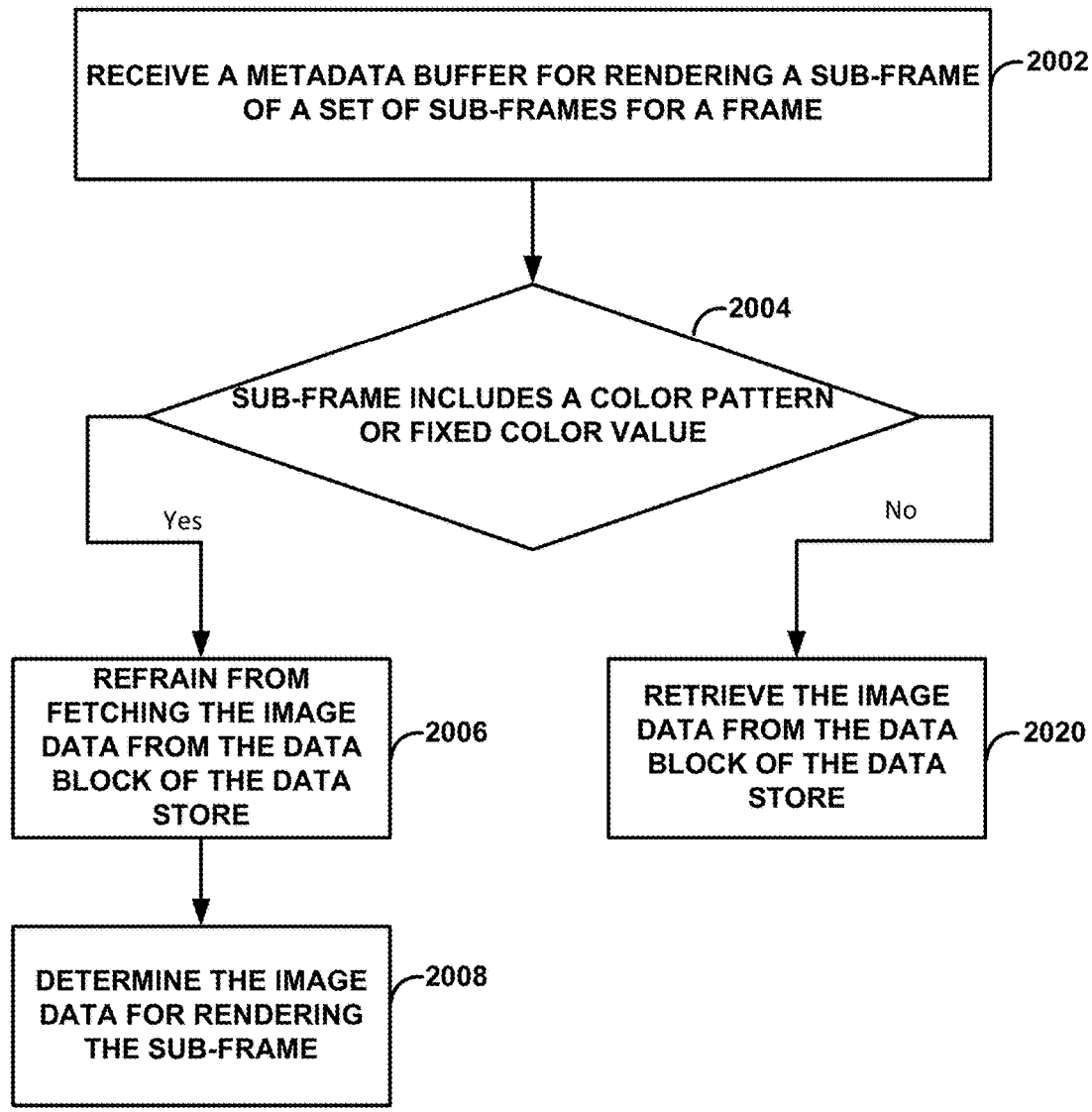
FIG. 20 is a flowchart illustrating an example method of determining image data for rendering a sub-frame according to techniques described in this disclosure.

FIG. 20 is a flowchart illustrating an example method of determining image data for rendering a sub-frame according to techniques described in this disclosure. FIG. 20 is discussed with computing device 102 of FIGS. 1 and 2 for exemplary purposes only. Initially, GPU 112 retrieves a metadata buffer for rendering a sub-frame of a set of sub-frames for a frame (2002). For instance, GPU 112 retrieves metadata buffer 260 stored system memory 110. GPU 112 determines whether the sub-frame includes a color pattern or fixed color value (2004). For instance, GPU 112 determines whether an indicator in the metadata buffer for the sub-frame indicates that the sub-frame includes a color pattern or fixed color. In response to determining that the sub-frame includes a color pattern or fixed color value ("Yes" of 2004), GPU 112 may refrain from fetching image data from a data block of a data buffer 242 (2006) and determine the image data for rendering the sub-frame (2008). For instance, GPU 112 may determine the image data for rendering the sub-frame according to an embedded fixed color value included in the metadata buffer, a pointer included in the metadata buffer, a color dictionary included in the metadata buffer, a fixed color data stream included in the metadata buffer, a fixed color data stream fetched from system memory 110, or using other information. In response, however, to determining that the sub-frame does not include a color pattern or fixed color value ("No" of 2004), GPU 112 may retrieve (e.g., fetch) image data from a data block of a data buffer 242 (2020).

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
retrieving first metadata for rendering a first sub-frame of a set of sub-frames for a frame, wherein the first sub-frame includes a first color pattern, a first fixed color value, or a first combination thereof, wherein the first metadata includes a pointer indicating a second sub-frame includes a second color pattern, a second fixed color value, or a second combination thereof corresponding to the first color pattern, the first fixed color value, or the first combination thereof included in the first sub-frame, and wherein a data block of a data buffer is configured to store first image data for rendering the first sub-frame; and
in response to determining, based on the first metadata, that the first sub-frame includes the first color pattern, the first fixed color value, or the first combination thereof corresponding to the second color pattern, the second fixed color value, or the second combination thereof:
refraining from retrieving the first image data from the data block;
retrieving, from the data buffer, second image data for the second sub-frame; and
assigning the second image data to the first sub-frame.

2. The method of claim 1, wherein the pointer indicates that the second sub-frame is geometrically adjacent, in the frame, to the first sub-frame.

3. The method of claim 1, wherein the pointer indicates a position of the first sub-frame relative to the second sub-frame.

4. The method of claim 1, wherein the first metadata indicates that the first sub-frame is obstructed, the method further comprising:
in response to determining that the first metadata indicates that the first sub-frame is obstructed, refraining from retrieving the first image data from the data block.

5. The method of claim 1, further comprising:
receiving uncompressed image data for rendering the first sub-frame; and
compressing the uncompressed image data for rendering the first sub-frame to generate the first image data,
wherein the first metadata indicates a size of the data block to store the first image data.

6. The method of claim 1, further comprising:
storing, prior to retrieving the first metadata, the first image data in the data block.

7. A device comprising:
a data buffer configured to store a data block, wherein the data block is configured to store first image data for rendering a first sub-frame of a set of sub-frames for a frame, wherein the first sub-frame includes a first color pattern, a first fixed color value, or a first combination thereof;
a metadata buffer configured to store first metadata for rendering the first sub-frame, wherein the first metadata includes a pointer indicating that a second sub-frame includes a second color pattern, a second fixed color value, or a second combination thereof corresponding to the first color pattern, the first fixed color value, or the first combination thereof included in the first sub-frame; and
a processor comprising integrated circuitry, the processor configured to:
in response to determining, based on the first metadata, that the first sub-frame includes the first color pattern, the first fixed color value, or the first combination thereof corresponding to the second color pattern, the second fixed color value, or the second combination thereof:
refrain from retrieving the first image data from the data block;
retrieve, from the data buffer, second image data for the second sub-frame; and
assign the second image data to the first sub-frame.

8. The device of claim 7, wherein the pointer indicates that the second sub-frame is geometrically adjacent, in the frame, to the first sub-frame.

9. The device of claim 7, wherein the pointer indicates a position of the first sub-frame relative to the second sub-frame.

10. The device of claim 7, wherein the first metadata indicates that the first sub-frame is obstructed, the processor being further configured to:
in response to determining that the first metadata indicates that the first sub-frame is obstructed, refrain from retrieving the first image data from the data block.

11. The device of claim 7, wherein the processor is further configured to:
receive uncompressed image data for rendering the first sub-frame; and
compress the uncompressed image data for rendering the first sub-frame to generate the first image data,
wherein the first metadata indicates a size of the data block to store the first image data.

12. The device of claim 7, wherein the processor is further configured to:
store, prior to retrieving the first metadata, the first image data in the data block.

13. A device comprising:
a data buffer configured to store a data block, wherein the data block is configured to store first image data for rendering a first sub-frame of a set of sub-frames for a frame;

a metadata buffer configured to store first metadata for rendering the first sub-frame, wherein the first metadata includes a first portion of a set of portions that indicates a particular color value; and a processor comprising integrated circuitry, the processor configured to:
  in response to determining, based on the first metadata, that the first sub-frame includes a first color pattern, a first color value, or a first combination thereof:
    refrain from retrieving the first image data from the data block;
    determine, based on second metadata for rendering a second sub-frame, a second portion of the set of portions that indicates the particular color value;
    determine a fixed color value for the first sub-frame based on the first portion and the second portion; and
  assign the fixed color value for the first sub-frame to each pixel of the first sub-frame.

14. A device comprising:
a cache;
system memory comprising:
  a data buffer configured to store a data block, wherein the data block is configured to store first image data for rendering a first sub-frame of a set of sub-frames for a frame, wherein the first sub-frame is associated with a first memory address that indicates a location of the first image data stored in the system memory, wherein a second sub-frame is associated with a second memory address that indicates a location of second image data for rendering the second sub-frame stored in the system memory, and wherein the second image data is stored in the cache and indexed by the second memory address; and
  a metadata buffer configured to store first metadata for rendering the first sub-frame; and
a processor comprising integrated circuitry, the processor configured to, in response to determining, based on the first metadata, that the first sub-frame includes a color pattern, fixed color value, or combination thereof:
  refrain from retrieving the first image data from the data block; and
  determine the first image data based on the first metadata and based on the second sub-frame, wherein to determine the first image data, the processor is configured to:
    in response to determining that the first metadata indicates that the first sub-frame corresponds to the second sub-frame, modify the first memory address for the first sub-frame to match the second memory address for the second sub-frame;
    in response to determining that the second image data is stored in the cache and indexed by the modified first memory address, retrieve the second image data from the cache; and
    determine the first image data according to the second image data that is stored in the cache and indexed by the modified first memory address.

15. A non-transitory computer-readable storage medium storing instructions that when executed cause one or more processors to:
  retrieve first metadata for rendering a first sub-frame of a set of sub-frames for a frame, wherein the first sub-frame includes a first color pattern, a first fixed color value, or a first combination thereof, wherein the first metadata includes a pointer indicating a second sub-frame includes a second color pattern, a second fixed color value, or a second combination thereof corresponding to the first color pattern, the first fixed color value, or the first combination thereof included in the first sub-frame and wherein a data block of a data buffer is configured to store first image data for rendering the first sub-frame; and
  in response to determining, based on the first metadata, that the first sub-frame includes the first color pattern, the first fixed color value, or the first combination thereof corresponding to the second color pattern, the second fixed color value, or the second combination thereof:
    refrain from retrieving the first image data from the data block;
    retrieve, from the data buffer, second image data for the second sub-frame; and
    assign the second image data to the first sub-frame.

* * * * *